United States Patent
Puri et al.

(10) Patent No.: US 9,794,569 B2
(45) Date of Patent: Oct. 17, 2017

(54) CONTENT ADAPTIVE PARTITIONING FOR PREDICTION AND CODING FOR NEXT GENERATION VIDEO

(71) Applicants: Atul Puri, Redmond, WA (US); Neelesh N. Gokhale, Seattle, WA (US)

(72) Inventors: Atul Puri, Redmond, WA (US); Neelesh N. Gokhale, Seattle, WA (US)

(73) Assignee: Intel Corporation, Santa Clara, CA (US)

(*) Notice: Subject to any disclaimer, the term of this patent is extended or adjusted under 35 U.S.C. 154(b) by 402 days.

(21) Appl. No.: 14/379,548

(22) PCT Filed: Dec. 24, 2013

(86) PCT No.: PCT/US2013/077702
§ 371 (c)(1),
(2) Date: Aug. 19, 2014

(87) PCT Pub. No.: WO2014/120369
PCT Pub. Date: Aug. 7, 2014

(65) Prior Publication Data
US 2015/0016523 A1    Jan. 15, 2015

Related U.S. Application Data

(60) Provisional application No. 61/758,314, filed on Jan. 30, 2013.

(51) Int. Cl.
H04N 19/51    (2014.01)
H04N 19/52    (2014.01)
(Continued)

(52) U.S. Cl.
CPC .......... *H04N 19/13* (2014.11); *H04N 19/105* (2014.11); *H04N 19/117* (2014.11); *H04N 19/119* (2014.11); *H04N 19/12* (2014.11); *H04N 19/122* (2014.11); *H04N 19/124* (2014.11); *H04N 19/126* (2014.11);
(Continued)

(58) Field of Classification Search
CPC ........ H04N 19/53; H04N 19/569; H04N 7/32; H04N 7/36; G06F 15/16; G06K 9/56
See application file for complete search history.

(56) References Cited

U.S. PATENT DOCUMENTS 5,675,386 A    10/1997    Lee et al.
5,729,691 A    3/1998    Agarwal
(Continued)

FOREIGN PATENT DOCUMENTS

EP    799550 B1    8/2000
EP    2271102 A1    1/2011
(Continued)

OTHER PUBLICATIONS

Extended European Search Report, mailed Aug. 12, 2016, for EP Patent Application No. 13874126.9, 7 pages.
(Continued)

*Primary Examiner* — Sath V Perungavoor
*Assistant Examiner* — Patricia I Young
(74) *Attorney, Agent, or Firm* — Green, Howard & Mughal, LLP.

(57) ABSTRACT

Techniques related to content adaptive partitioning for prediction and coding are described.

22 Claims, 18 Drawing Sheets

(51) Int. Cl.
| | |
|---|---|
| H04N 19/503 | (2014.01) |
| H04N 19/13 | (2014.01) |
| H04N 19/105 | (2014.01) |
| H04N 19/124 | (2014.01) |
| H04N 19/182 | (2014.01) |
| H04N 19/513 | (2014.01) |
| H04N 19/167 | (2014.01) |
| H04N 19/169 | (2014.01) |
| H04N 19/17 | (2014.01) |
| H04N 19/186 | (2014.01) |
| H04N 19/122 | (2014.01) |
| H04N 19/176 | (2014.01) |
| H04N 19/61 | (2014.01) |
| H04N 19/91 | (2014.01) |
| H04N 19/63 | (2014.01) |
| H04N 19/119 | (2014.01) |
| H04N 19/96 | (2014.01) |
| H04N 19/12 | (2014.01) |
| H04N 19/136 | (2014.01) |
| H04N 19/139 | (2014.01) |
| H04N 19/159 | (2014.01) |
| H04N 19/184 | (2014.01) |
| H04N 19/192 | (2014.01) |
| H04N 19/573 | (2014.01) |
| H04N 19/59 | (2014.01) |
| H04N 19/117 | (2014.01) |
| H04N 19/82 | (2014.01) |
| H04N 19/517 | (2014.01) |
| H04N 19/523 | (2014.01) |
| H04N 19/53 | (2014.01) |
| H04N 19/577 | (2014.01) |
| H04N 19/196 | (2014.01) |
| H04N 19/126 | (2014.01) |
| H04N 19/31 | (2014.01) |
| H04N 19/40 | (2014.01) |
| H04N 19/14 | (2014.01) |
| H04N 19/172 | (2014.01) |
| H04N 19/593 | (2014.01) |
| H04N 19/44 | (2014.01) |

(52) U.S. Cl.
CPC ......... *H04N 19/136* (2014.11); *H04N 19/139* (2014.11); *H04N 19/14* (2014.11); *H04N 19/159* (2014.11); *H04N 19/167* (2014.11); *H04N 19/17* (2014.11); *H04N 19/172* (2014.11); *H04N 19/176* (2014.11); *H04N 19/182* (2014.11); *H04N 19/184* (2014.11); *H04N 19/186* (2014.11); *H04N 19/1887* (2014.11); *H04N 19/192* (2014.11); *H04N 19/196* (2014.11); *H04N 19/31* (2014.11); *H04N 19/40* (2014.11); *H04N 19/513* (2014.11); *H04N 19/517* (2014.11); *H04N 19/523* (2014.11); *H04N 19/53* (2014.11); *H04N 19/573* (2014.11); *H04N 19/577* (2014.11); *H04N 19/59* (2014.11); *H04N 19/593* (2014.11); *H04N 19/61* (2014.11); *H04N 19/63* (2014.11); *H04N 19/82* (2014.11); *H04N 19/91* (2014.11); *H04N 19/96* (2014.11); *H04N 19/44* (2014.11)

(56) References Cited

U.S. PATENT DOCUMENTS

| | | | |
|---|---|---|---|
| 5,953,506 A * | 9/1999 | Kalra | .................. G06T 3/4092 345/428 |
| 8,009,965 B2 | 8/2011 | Takao | |
| 2002/0044604 A1 | 4/2002 | Nieweglowski et al. | |
| 2004/0114684 A1 | 6/2004 | Karczewicz et al. | |
| 2005/0094729 A1 | 5/2005 | Yuan et al. | |
| 2006/0133479 A1 | 6/2006 | Chen et al. | |
| 2006/0251330 A1 | 11/2006 | Toth et al. | |
| 2007/0291849 A1 | 12/2007 | Lainema | |
| 2008/0112489 A1 | 5/2008 | Malladi et al. | |
| 2009/0046937 A1 | 2/2009 | Fenney et al. | |
| 2009/0154567 A1 | 6/2009 | Lei et al. | |
| 2009/0167775 A1 | 7/2009 | Lu et al. | |
| 2009/0175333 A1 | 7/2009 | Hsiang | |
| 2009/0196517 A1 | 8/2009 | Divorra et al. | |
| 2009/0257664 A1 | 10/2009 | Kao et al. | |
| 2009/0279615 A1 | 11/2009 | Au et al. | |
| 2010/0002775 A1 | 1/2010 | Huang et al. | |
| 2010/0040146 A1 | 2/2010 | Wang et al. | |
| 2010/0046845 A1 | 2/2010 | Wedi et al. | |
| 2010/0202521 A1 | 8/2010 | Koo et al. | |
| 2010/0269009 A1 | 10/2010 | Okamura et al. | |
| 2011/0051811 A1 | 3/2011 | Wang et al. | |
| 2011/0058611 A1 | 3/2011 | Sugimoto et al. | |
| 2011/0109721 A1 | 5/2011 | Hong et al. | |
| 2011/0255610 A1 | 10/2011 | Kameyama et al. | |
| 2011/0294544 A1 | 12/2011 | Liang et al. | |
| 2012/0128070 A1 | 5/2012 | Kim et al. | |
| 2012/0134412 A1 | 5/2012 | Shibahara et al. | |
| 2012/0155532 A1 | 6/2012 | Puri et al. | |
| 2012/0155533 A1 | 6/2012 | Puri et al. | |
| 2012/0207222 A1 | 8/2012 | Lou et al. | |
| 2012/0257677 A1 | 10/2012 | Bankoski | |
| 2013/0003837 A1 | 1/2013 | Yu et al. | |
| 2013/0177079 A1 * | 7/2013 | Kim | .................. H04N 19/00569 375/240.12 |
| 2014/0328400 A1 | 11/2014 | Puri et al. | |

FOREIGN PATENT DOCUMENTS

| | | |
|---|---|---|
| JP | 2011-223068 A | 11/2011 |
| JP | 2012-080213 A | 4/2012 |
| JP | 2012-517132 A | 7/2012 |
| KR | 10-2008-0067363 A | 7/2008 |
| KR | 10-0948714 B1 | 3/2010 |
| KR | 10-2010-0042542 A | 4/2010 |
| KR | 10-2011-0112171 A | 10/2011 |
| KR | 10-2011-0112180 A | 10/2011 |
| KR | 10-2011-0113583 A | 10/2011 |
| KR | 10-2011-0129493 A | 12/2011 |
| KR | 10-2012-0080548 A | 7/2012 |
| KR | 10-2012-0086232 A | 8/2012 |
| KR | 10-2012-0120091 A | 11/2012 |
| KR | 10-2013-0010124 A | 1/2013 |
| KR | 10-2013-0045425 A | 5/2013 |
| WO | 2010/086393 A1 | 8/2010 |
| WO | 2011/039931 A1 | 4/2011 |
| WO | 2011/127961 A1 | 10/2011 |
| WO | 2011128269 | 10/2011 |
| WO | 2012/045037 A2 | 4/2012 |
| WO | 2013/003726 A1 | 1/2013 |
| WO | 2014/078068 A1 | 5/2014 |
| WO | 2014/078422 A1 | 5/2014 |
| WO | 2014/088772 A1 | 6/2014 |
| WO | 2014/109826 A1 | 7/2014 |
| WO | 2014/120369 A1 | 8/2014 |
| WO | 2014/120373 A1 | 8/2014 |
| WO | 2014/120374 A1 | 8/2014 |
| WO | 2014/120575 A1 | 8/2014 |
| WO | 2014/120656 A1 | 8/2014 |
| WO | 2014120367 | 8/2014 |

OTHER PUBLICATIONS

International Preliminary Report on Patentability for PCT/US2013/077692 mailed Aug. 13, 2015, 10 pages.

Search Report for European Patent Application No. 13873683.0, issued on Jun. 16, 2016, 8 pages.

Chang, et al., "Direction-Adaptive Partitioned Block Transform for color Image Coding", IEEE Transactions on Image Processing, vol. 19, No. 7, Jul. 2010, pp. 1740-1755.

(56) References Cited

OTHER PUBLICATIONS

Minasyan, et al., "On a Class of Parametric Transforms and Its Application to Image Compression", EURASIP Journal on Advances in Signal Processing, 2007, 1 Page of Abstract Only.
Minasyan, et al., "On Unified Architectures for Synthesizing and Implementation of Fast Parametric Transforms", Fifth International Conference on Information, Communications and Signal Processing, 2005, 1 Page of Abstract Only.
Minasyan, et al., "An image compression scheme based on parametric Haar-like transform", IEEE International Symposium on Circuits and Systems, May 2005, pp. 2088-2091.
Schrack, et al., "A Fast Distance Approximation Algorithm for Encoded Quadtree Location", Canadian Conference on Electrical and Computer Engineering, Sep. 14-17, 1993, 1 Page of Abstract Only.
Volder, "The CORDIC Computing Technique", Proceedings of the Western Joint Computer Conference, 1959, pp. 257-261.
International Search Report and Written Opinion received for PCT Patent Application No. PCT/US2013/067182, mailed on Jan. 29, 2014, 10 Pages.
International Search Report and Written Opinion received for PCT Patent Application No. PCT/US2013/069905, mailed on Feb. 26, 2014, 16 Pages.
International Search Report and Written Opinion received for PCT Patent Application No. PCT/US2013/069960, mailed on Mar. 14, 2014, 11 Pages.
International Search Report and Written Opinion received for PCT Patent Application No. PCT/US2013/069962, mailed on Dec. 4, 2013, 5 Pages.
International Search Report and Written Opinion received for PCT Patent Application No. PCT/US2013/077692, mailed on Apr. 11, 2014, 15 Pages.
International Search Report and Written Opinion received for PCT Patent Application No. PCT/US2013/077702, mailed on Apr. 10, 2014, 11 Pages.
International Search Report and Written Opinion received for PCT Patent Application No. PCT/US2013/077967, mailed on Apr. 10, 2014, 16 Pages.
International Search Report and Written Opinion received for PCT Patent Application No. PCT/US2013/078114, mailed on May 13, 2014, 21 Pages.
International Search Report and Written Opinion received for PCT Patent Application No. PCT/US2014/013027, mailed on May 20, 2014, 12 Pages.
International Search Report and Written Opinion received for PCT Patent Application No. PCT/US2014/013333, mailed on May 20, 2014, 11 Pages.
Chujoh et al., "Specification and experimental results of quadtree-based adaptive loop filter", ITU-Telecommunications Standardization Sector, VCEG-AK22, Apr. 2009, 11 Pages.
International Preliminary Report on Patentability for PCT Patent Application No. PCT/US2013/0777002, mailed Aug. 13, 2015.
Non-Final Office Action for U.S. Appl. No. 14/379,532, notified on Sep. 30, 2016.
English Translation of Notice of Preliminary Rejection, mailed Oct. 21, 2016, for Korean Patent Application No. 2015-7017114.
Office Action for Chinese Patent Application No. 201380068582.0 dated Jul. 31, 2017.
Office Action for European Patent Application No. 13874126.9, dated Jun. 1, 2017.
Xu, Jizheng et al., "An Overview of Directional Transforms in Image Coding", IEEE Int'l Symposium on Circuits and Systems, ISCAS May 30, 2010 to Jun. 2, 2010, Paris, France, IEEE, US, May 30, 2010, pp. 3036-3039.

* cited by examiner

700

```
┌─────────────────────────────────────────────────┐
│           Receive a Video Frame                 │
│                                                 │
│                    702                          │
└─────────────────────────────────────────────────┘
                        │
                        ▼
┌─────────────────────────────────────────────────┐
│  Segment the Video Frame into Tiles, Coding     │
│         Units or Super-Fragments                │
│                                                 │
│                    704                          │
└─────────────────────────────────────────────────┘
                        │
                        ▼
┌─────────────────────────────────────────────────┐
│ Determine a Chosen Prediction Partitioning      │
│ Technique (e.g., K-d Tree or Bi-Tree            │
│ Partitioning) for a Tile, Coding Unit, or       │
│ Super-Fragment                                  │
│                                                 │
│                    706                          │
└─────────────────────────────────────────────────┘
                        │
                        ▼
┌─────────────────────────────────────────────────┐
│ Partition the Tile, Coding Unit, or Super-      │
│ Fragment into a Plurality of Potential          │
│ Prediction Partitions Using the Chosen          │
│ Prediction Partitioning Technique               │
│                                                 │
│                    708                          │
└─────────────────────────────────────────────────┘
```

FIG. 7

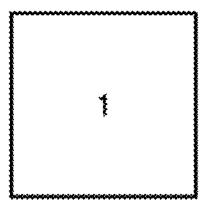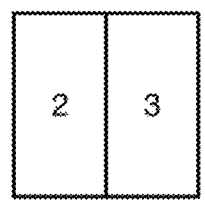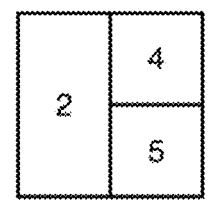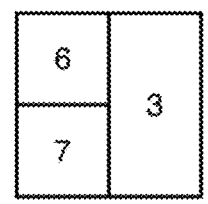
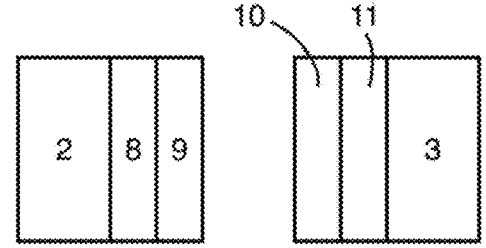
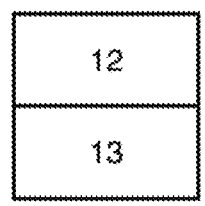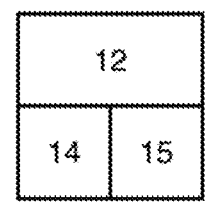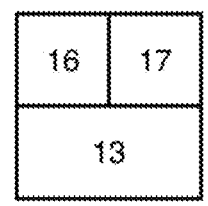
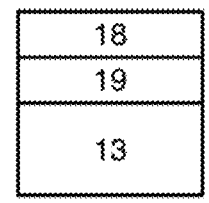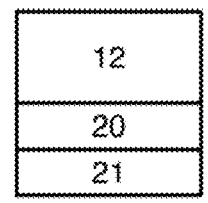
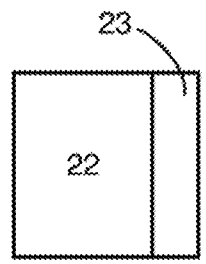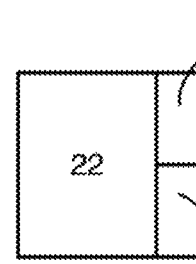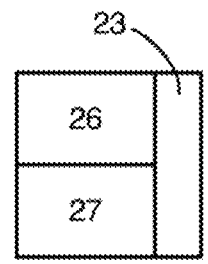
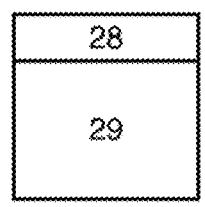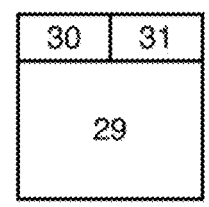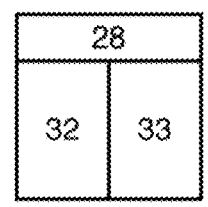
FIG. 9

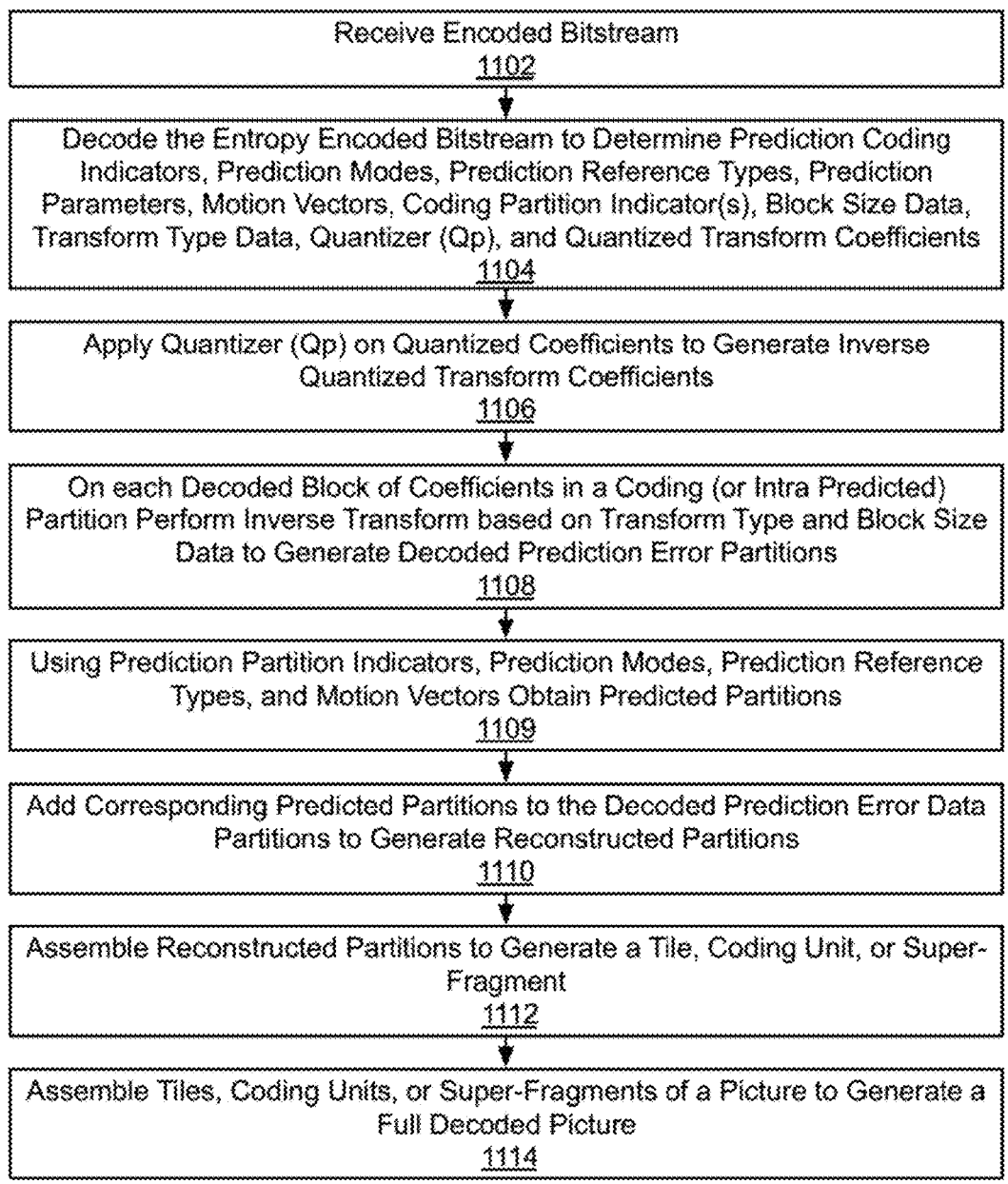

CONTENT ADAPTIVE PARTITIONING FOR PREDICTION AND CODING FOR NEXT GENERATION VIDEO

RELATED APPLICATIONS

This application claims the benefit of PCT Patent Application No. PCT/US2013/077702, filed on Dec. 24, 2013, titled as "CONTENT ADAPTIVE PARTITIONING FOR PREDICTION AND CODING FOR NEXT GENERATION VIDEO" and this application claims the benefit of U.S. Provisional Application No. 61/758,314 filed on 30 Jan. 2013 and titled "NEXT GENERATION VIDEO CODER", the contents of which are hereby incorporated in their entirety.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 7 is a flow diagram showing a subset of an example encoding process;

FIG. 9 illustrates example partitioning of a frame portion using a k-d tree partitioning technique FIG. 10 illustrates an example bitstream;

FIG. 11 is a flow diagram showing an example decoding process;

DETAILED DESCRIPTION

Figure 1:
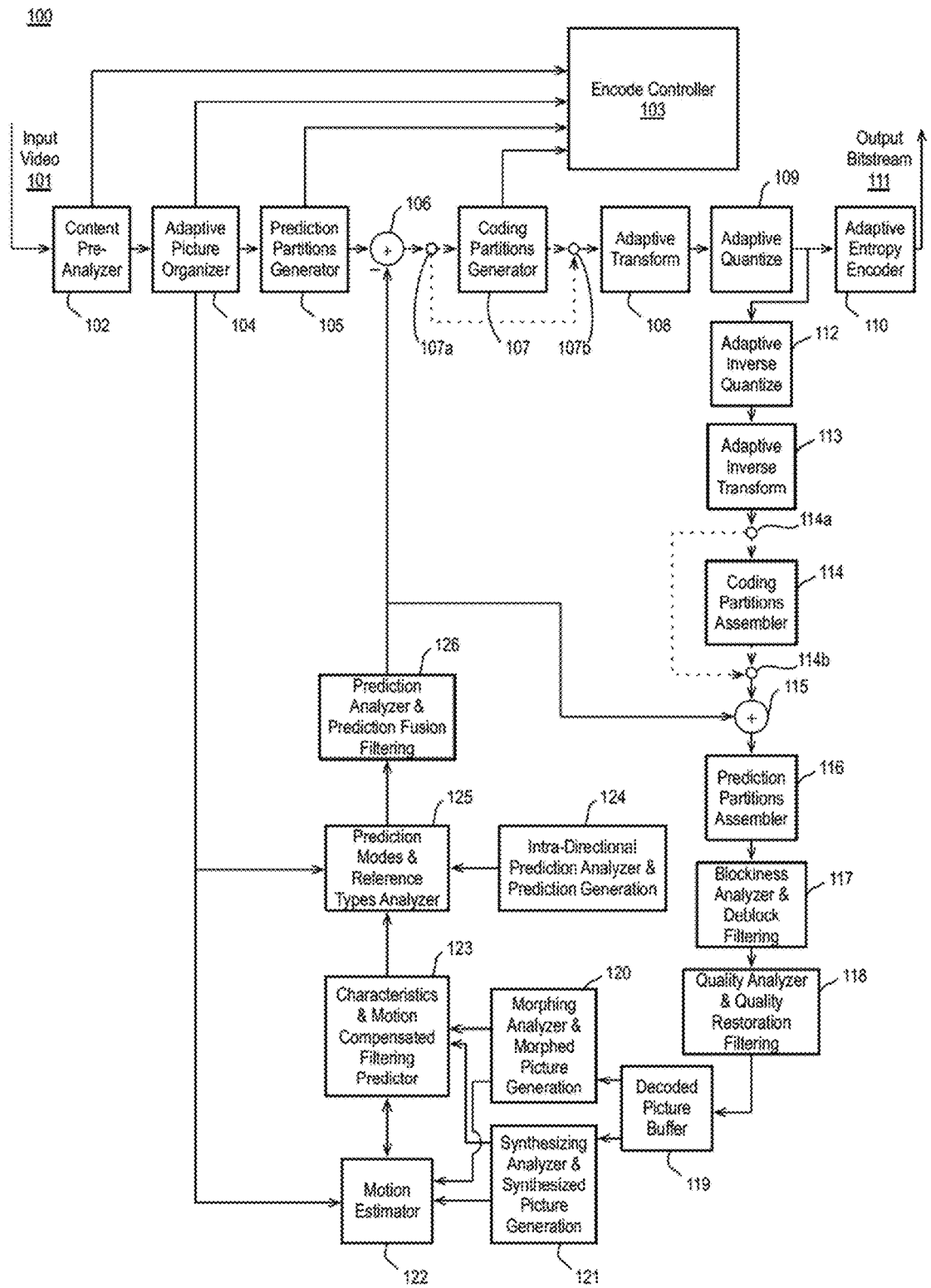
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.); and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to content adaptive partitioning for prediction and coding for next generation video coding.

Next generation video (NGV) systems, apparatus, articles, and methods are described below. NGV video coding may incorporate significant content based adaptivity in the video coding process to achieve higher compression. As discussed above, the H.264/AVC standard may have a variety of limitations and ongoing attempts to improve on the standard, such as, for example, the HEVC standard may use iterative approaches to address such limitations. Herein, an NGV system including an encoder and a decoder will be described.

Also as discussed, the H.264/AVC standard may include limited choices of prediction partitions and coding partitions. In particular, as discussed herein, a video frame may received for coding. In some examples, the video frame may be segmented into tiles, coding units, or super-fragments (e.g., tiles, coding units, or super-fragments may be described as frame portions herein). For example, a tile or coding unit may be a square or rectangular portion of the video frame. The video frame may fully divided into a plurality of tiles, or coding unit, or coding units, for example. In other examples, the video frame may be segmented into super-fragment. For example, a video frame may be segmented into two or more region layers. In some examples, the region layers may represent a fore-ground, a back-ground, and a middle-ground of a scene or the like. In such examples, the video frame may also be divided into tiles. A super-fragment may include an individual region layer portion of a tile. For example, if a tile includes only one region layer, the super-fragment may be the entire tile. If a tile includes two region layers, the tile may be divided into two super-fragments, one super-fragment including the tile portion having first region layer and a second super-fragment including the tile portion having the second region layer, and so on. The super-fragments may be of any shape and may be either contiguous or non-contiguous.

In any case, a chosen technique may be determined for prediction partitioning a tile, coding unit, or super-fragment of a video frame. In some examples, the chosen technique may be chosen based on a picture type of the video frame. In other examples, the chosen technique may be chosen based on a characteristic of the tile, coding unit, or super-fragment being partitioned. In some examples, the chosen technique may be chosen from a bi-tree partitioning or a k-d tree partitioning. In some NGV implementations, three picture types may be used (although sub-types may also be utilized): I-picture (e.g., intra compensation only), P-picture (e.g., predictive) or FB-picture (e.g., functional/bi-directional). As discussed, in some examples, the chosen technique may be based on the picture type of the video frame. For example, if the picture type is I-picture, the chosen technique may be k-d tree partitioning and if the picture type is P-picture or F-picture, the chosen technique may be bi-tree partitioning. Based on the chosen prediction partitioning technique, the frame portion may be partitioned into any number of prediction partitions.

Various candidate or potential prediction partitionings into prediction partitions may be performed. The prediction partitions of the candidate partitionings may be indexed and transmitted to an encode controller, which may determine which prediction partitions (e.g., prediction partitioning) to use in various encoding implementations (e.g., a variety of partitionings having different prediction partitions may be evaluated via a rate distortion optimization or the like to determine a selected prediction partitioning). Further, the prediction partitions may be used for inter-prediction (e.g., motion compensation) or intra-prediction. Data associated with the prediction partitions (e.g., the partition shape and location in the video frame or the like) and the inter- or intra-prediction data may be encoded into a bitstream for transmission to a decoder as discussed herein via indicators or codewords or the like.

Further, via a decode loop implemented at an encoder, a predicted partition (e.g., predicted pixel data associated with a prediction partition) may be generated. The predicted partition and the actual partition (e.g., original pixel data) may be differenced to determine a prediction error data partition (e.g., a residual or error signal). It may be determined whether the prediction error data partition is required to be coded (e.g., transform encoded and quantized) via a threshold or the like. In some examples, the prediction error data partition associated with the prediction partition may be coded directly. For example, frames that are I-pictures may be coded without further sub-partitioning such as coding partitioning. In other examples, the prediction partition may be further partitioned into coding partitions or "chips" prior to coding. For example, frames that are P- or F/B-pictures may be further partitioned prior to coding (e.g., coding partitioned). In some examples, the coding partitioning may be performed via bi-tree partitioning. As with prediction partitioning, various candidate or potential coding partitionings may be performed. The coding partitions of the candidate coding partitionings may be indexed and transmitted to an encode controller, which may determine which coding partitions to use in the encoding or the like (e.g., a variety of partitionings having different coding partitions may be evaluated—along with various types of transforms in some examples—via a rate distortion optimization or the like to determine a selected coding partitioning). Data associated with the coding partitions (e.g., the coding partition shape and location via indicators or codewords or the like) and the associated prediction error data may be transform coded, quantized, and encoded into a bitstream for transmission to a decoder as discussed herein.

In some examples, a decoder may receive and decode the bitstream to determine inter- or intra-prediction data associated with a prediction partition, data defining the prediction partition (e.g., indicators or codewords as discussed), data associated with an individual prediction error data partition (e.g., quantized coefficients), or the like. Inter- or intra-prediction may be performed on the prediction partition as discussed herein and further processing may be performed to generated video frames for presentment. Further, data defining the prediction partition (e.g., coding partitions of prediction error data partitions) may be inverse quantized and inverse transformed to generate decoded coding partitions, which may be combined to generate decoded prediction error data partitions. The decoded prediction error data partitions may be added with (decoded) predicted partitions to generate a reconstructed partition, which may be assembled with other reconstructed partition(s) to generate a tile, coding unit, or super-fragment. Optional deblock filtering and/or quality restoration filtering may be applied to the tile, coding unit, or super-fragment, which may be assembled with other tile(s) or coding unit(s) or super-fragment(s) to generate a decoded video frame. The decoded video frame may be used for the decoding of other frames and/or transmitted for presentment via a display device.

As used herein, the term "coder" may refer to an encoder and/or a decoder. Similarly, as used herein, the term "coding" may refer to performing video encoding via an encoder and/or performing video decoding via a decoder. For example, a video encoder and video decoder may both be examples of coders capable of coding video data. In addition, as used herein, the term "codec" may refer to any process, program or set of operations, such as, for example, any combination of software, firmware, and/or hardware that may implement an encoder and/or a decoder. Further, as used herein, the phrase "video data" may refer to any type of data associated with video coding such as, for example, video frames, image data, encoded bit stream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles, coding units, or super-fragments or the like. In some examples, an additional module (e.g., between modules 104 and 105) may be provided for dividing a frame or picture into tiles, coding units, or super-fragments. Prediction partitions generator module 105 may divide each tile, coding unit, or super-fragment into potential (e.g., candidate) prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., pixel data of a prediction of the prediction partition of the current frame based on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example.

As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions (or prediction partitions if coding partitions are not employed or only one level of partitioning is employed such partitions may be considered coding or partition partitions). In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles, or coding unit, or super-fragments. In some examples, coding partitions assembler module 114 and prediction partitions assembler module 116 may together be considered an un-partitioner subsystem of encoder 100.

The reconstructed tiles, or coding unit, or super-fragments may be transmitted to blockiness analyzer and deblock filtering module 117. Blockiness analyzer and deblock filtering module 117 may deblock and dither the reconstructed tiles, or coding unit, or super-fragments (or prediction partitions of tiles, or coding unit, or super-fragments). The generated deblock and dither filter parameters may be used for the current filter operation and/or coded in bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1, inter-prediction may be performed by one or more modules including morphing analyzer and morphed picture generation module 120, synthesizing analyzer and synthesized picture generation module 121, and characteristics and motion filtering predictor module 123. Morphing analyzer and morphed picture generation module 120 may analyze a current picture to determine parameters for changes in gain, changes in dominant motion, changes in registration, and changes in blur with respect to a reference frame or frames with which it is to be coded. The determined morphing parameters may be quantized/de-quantized and used (e.g., by morphing analyzer and morphed picture generation module 120) to generate morphed reference frames that that may be used by motion estimator module 122 for computing motion vectors for efficient motion (and characteristics) compensated prediction of a current frame. Synthesizing analyzer and synthesized picture generation module 121 may generate super resolution (SR) pictures and projected interpolation (PI) pictures or the like for motion for determining motion vectors for efficient motion compensated prediction in these frames.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes from among, "skip", "auto", "inter", "split", "multi", and "intra", for each prediction partition of a tile (or coding unit or super-fragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

Figure 2:
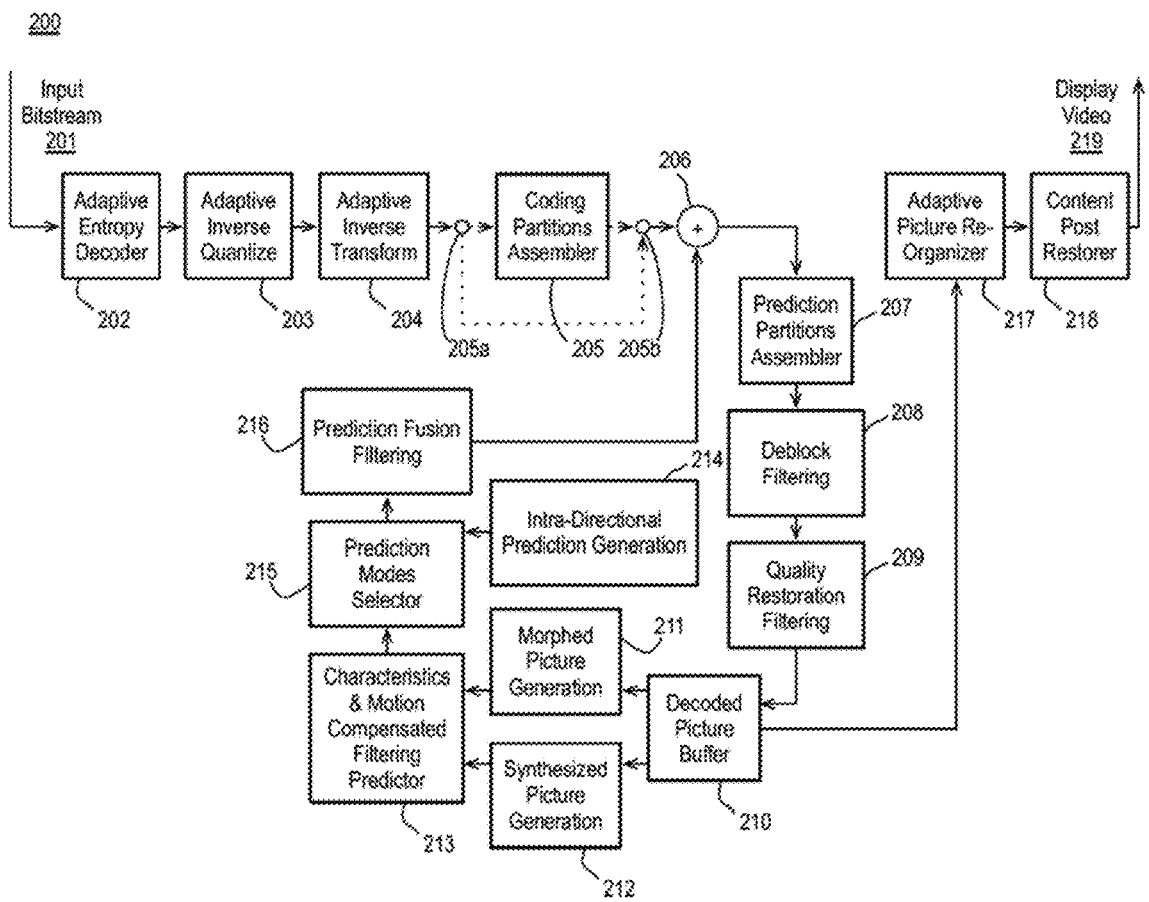
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles, coding units, or super-fragments. In some examples, coding partitions assembler module 205 and prediction partitions assembler module 207 may together be considered an un-partitioner subsystem of decoder 200.

The reconstructed tiles, coding units, or super-fragments may be transmitted to deblock filtering module 208.

Deblock filtering module 208 may deblock and dither the reconstructed tiles, coding units, or super-fragments (or prediction partitions of tiles, coding units, or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphed picture generation module 211, synthesized picture generation module 212, and characteristics and motion compensated filtering predictor module 213. Morphed picture generation module 211 may use de-quantized morphing parameters (e.g., determined from input bitstream 201) to generate morphed reference frames. Synthesized picture generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile or the like, all of which may apply to P- and F/B-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

As discussed, in some examples, encoder 100 and/or decoder 200 may implement techniques related to content adaptive partitioning for prediction and coding for next generation video coding. In some examples, content adaptive partitioning for prediction may be performed by prediction partitions generator module 105 of encoder 100. In some examples, content adaptive partitioning for coding may be performed by coding partitions generator module 107 of encoder 100. In some examples, content adaptive partitioning for prediction for inter-prediction or the like may be performed by prediction partitions generator module 105 and content adaptive partitioning for coding for inter-prediction or the like may be performed by coding partitions generator module 107 of encoder 100. In some examples, content adaptive partitioning for prediction/coding (e.g., only one layer of partitioning) for intra-prediction may be performed by prediction partitions generator module 105 or coding partitions generator module 107 of encoder 100. Further, in some examples, based on encoded prediction partitioning and/or coding partitioning, coding partitions assembler module 114 of encoder 100 and/or coding partitions assembler module 205 of decoder 200 may assemble coding partitions to form prediction partitions. Also, in some examples, prediction partitions assembler 116 of encoder 100 and/or prediction partitions assembler 207 of decoder 200 may assemble reconstructed prediction partitions to form tiles, super-fragments, which may be assembled to generate frames or pictures. As discussed, the various prediction partitions, coding partitions, or tiles, coding units, or super-fragments may be used for inter-prediction, intra-prediction, other coding efficiency enhancement, or image or video enhancements as discussed herein.

While FIGS. 1 and 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3:
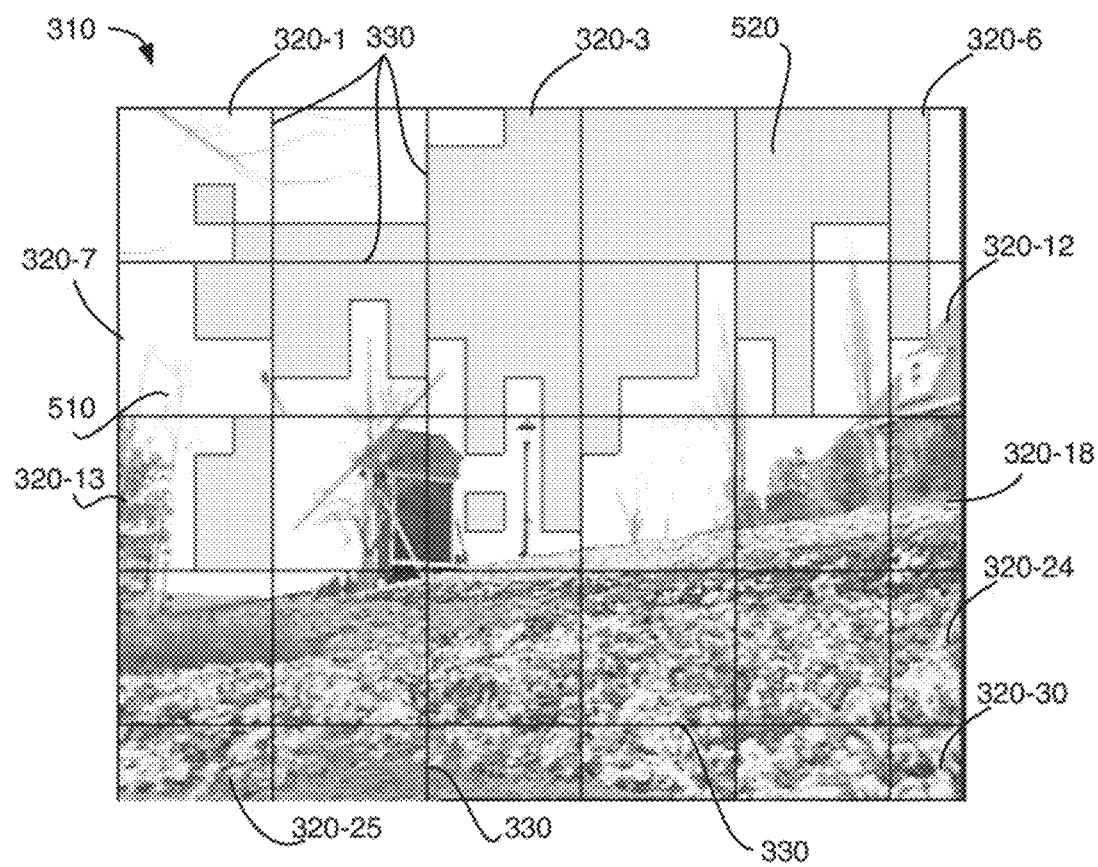
FIG. 3 illustrates an example video frame having example tiles, coding units, or super-fragments for partitioning.

FIG. 3 illustrates an example video frame 310 having example tiles, coding units, or super-fragments for partitioning, arranged in accordance with at least some implementations of the present disclosure. Video frame 310 may include any suitable video image, frame, picture, or data or the like for coding. In the illustrated example, video frame 310 includes a video frame from the "Flower" test sequence for illustrative purposes. As discussed, video frame 310 may be segmented into frame portions (e.g., tiles, coding units, or super-fragments). The frame portions may then be partitioned as will be discussed further below. Video frame 310 may be divided into frame portions using any suitable technique or techniques. In some examples, video frame 310 may be divided into tiles 320-1 through 320-30 (in FIG. 3, not every tile is labeled for the sake of clarity of presentation) via tile boundaries 330 such that tiles 320-1 through 320-30 or similar coding units may be the video frame portions for partitioning. Video frame 310 may include any number of tiles 320 and tiles 320 may be any size. In some examples, tiles 320 may be 64×64 pixels. Further, tiles 320 may have any shape. In various examples, tiles 320 may be square or rectangular. Also, as shown, tiles 320 may be of different shapes and sizes within frame 310. For example, tile 320-3 may be square and 64×64 pixels, tile 320-12 may be rectangular and 32×64 pixels, tile 320-30 may be square and 32×32 pixels, and so on.

Figure 5:
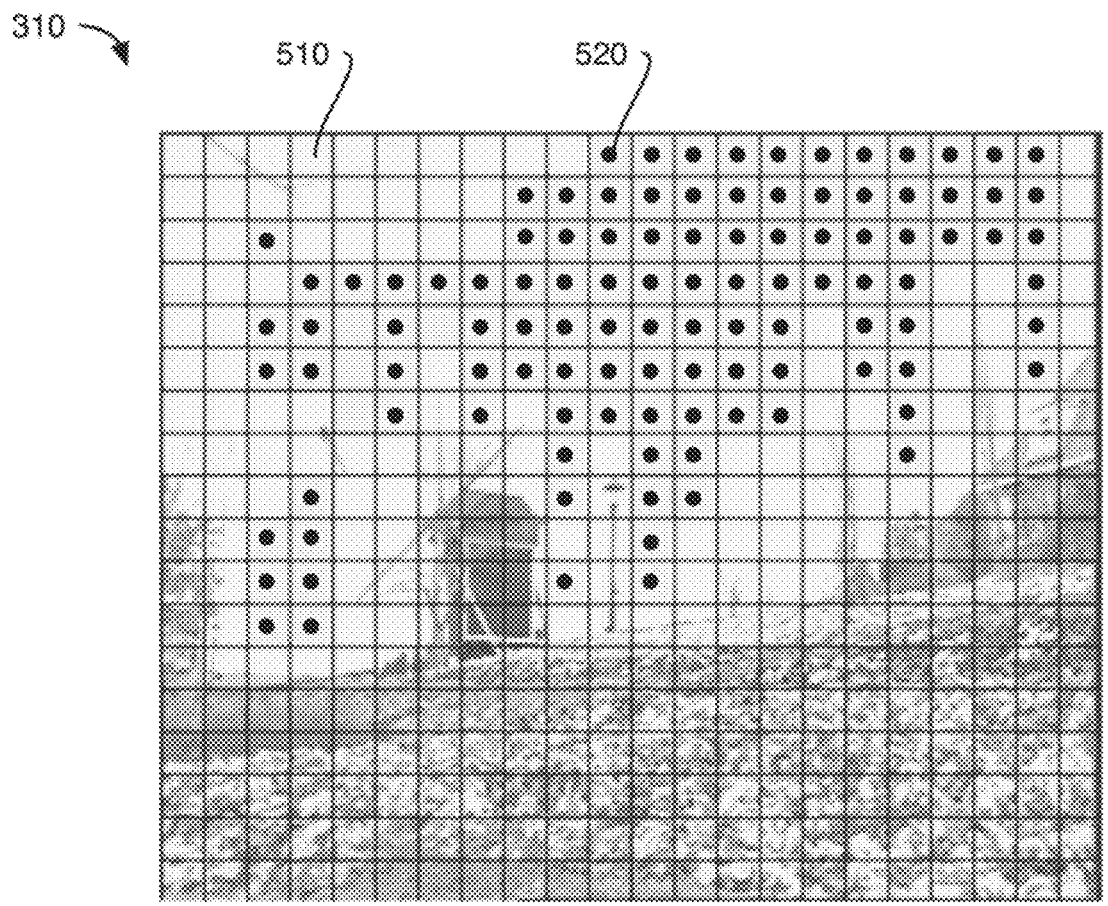
FIG. 5 illustrates example region layer segmentation of a video frame.

In other examples, the video frame portions for partitioning may be super-fragments. For example, to determine super-fragments, video frame 310 may be segmented into one or more region layers. The segmenting may be performed at any precision (e.g., pixel resolution) and quantized to any resolution based on efficiency constraints in terms of bit-cost. For example, the segmenting may be performed at 4-pel, 8-pel, or 16-pel precision (e.g., a precision of 4 pixels, 8, pixels, or 16 pixels), or the like. Turning now to FIG. 5, segmentation of a video frame into region layers is illustrated.

FIG. 5 illustrates example region layer segmentation of video frame 310, arranged in accordance with at least some implementations of the present disclosure. As shown in FIG. 5, video frame 310 may be segmented into one or more region layers. In the illustrated example of FIG. 5, video frame 310 may be segmented into two region layers: region layer 510 and region layer 520. In FIG. 5, region layer 510 includes video frame segments without a marking and region layer 520 includes video frame segments marked with a dot. For example, region layer 510 may represent back-ground portions of video frame 310 and region layer 520 may represent fore-ground portions of video frame 310. In some examples, the region layers may represent a fore-ground, a back-ground, and a middle-ground (or multiple middle-grounds) of a scene or the like. In some examples, video frame 310 may include a single region layer. In some examples, video frame 310 may include 3, 4, 5 or more region layers. In some examples, the segmentation of video frame 310 may be performed by prediction partitions generator module 105 (please refer to FIG. 1). In some examples, the segmentation of video frame 310 may be performed by another module (e.g., a tile, coding unit, or super-fragment generator module) inserted between adaptive picture organizer 104 prediction partitions generator 105. In some examples, the segmentation of video frame 310 may be performed by adaptive picture organizer module 104 (or a tile, coding unit, or super-fragment generator module of adaptive picture organizer module 104, for example). The segmentation may be performed using any suitable technique or techniques. In some examples, the segmentation may include a symbol-run coding technique.

Further, the region boundaries (e.g., boundaries between region layer 510 and region layer 520 or the like) may be coded for use at encoder 100 and/or decoder 200. The region boundary coding may be performed using any suitable technique or techniques. In some examples, the region boundary coding may include a symbol-run coding technique. In some examples, the region boundary coding may include generating a codebook that approximates the region boundaries on a tile grid. For example, the tile grid (which may or may not correspond to tiles 320 of FIG. 3) may be an equally spaced tile grid having a size of 32×32 pixels or 64×64 pixels or the like.

Returning to FIG. 3, region layer 510 and region layer 520 are shown such that region layer 520 is shown by obscuring the imagery of video frame 310 and region layer 510 is shown by not obscuring the imagery of video frame 310. Further, as discussed, video frame may be divided into tiles 320-1 through 320-30. In some examples, the frame portions for partitioning may include super-fragments that include an individual region layer portion of a tile, as illustrated in FIG. 4.

Figure 4:
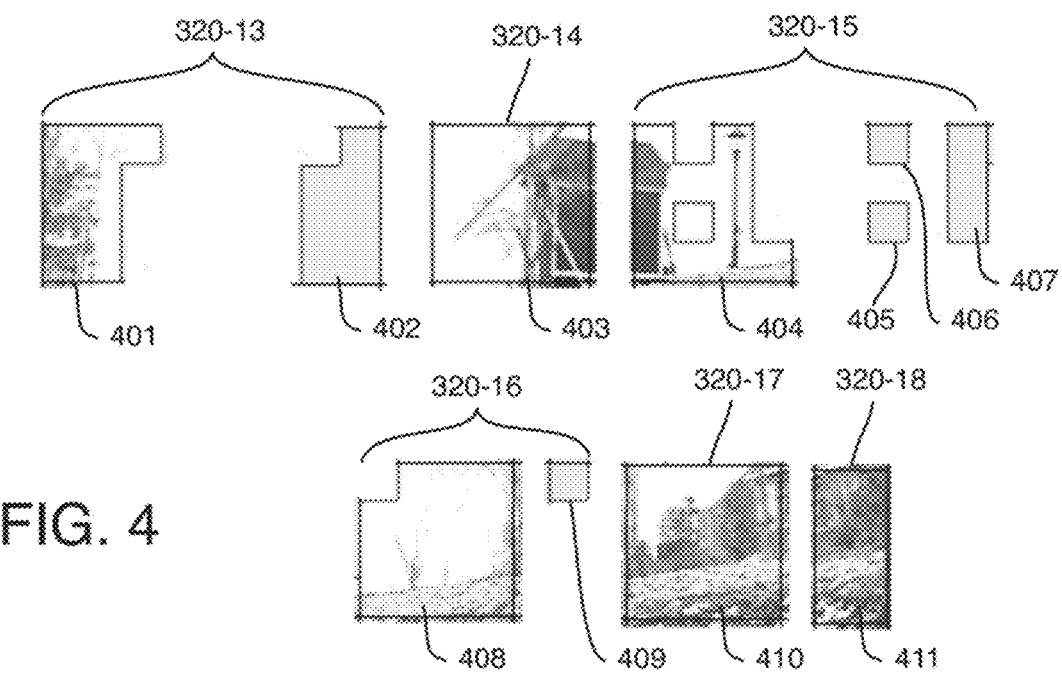
FIG. 4 illustrates example super-fragments of a row of tiles of an example video frame.

FIG. 4 illustrates example super-fragments 401 through 411 of a row of tiles 320-13 through 320-18 of example video frame 310, arranged in accordance with at least some implementations of the present disclosure. As shown, super-fragments 401-411 may include portions of a tile in a region layer. For example, super-fragment 401 may include the portion of tile 320-13 in region layer 510, super-fragment 402 may include the portion of tile 320-13 in region layer 520, super-fragment 403 may include the portion of tile 320-14 in region layer 510, and so on. As shown, a super-fragment may have substantially any shape and size (limited only by the precision of the described segmenting operation). For example, super-fragments 403, 410, and 411 may be the entirety of tiles 320-14, 320-17, and 320-18, respectively, such that those super-fragments may be the same shape as their respective tiles. Further, super-fragments 401 and 404-409 illustrate a variety of possible shapes while many others are also possible. Further still, super-fragment 404 illustrates that a super-fragment need not be contiguous.

Figure 6A:
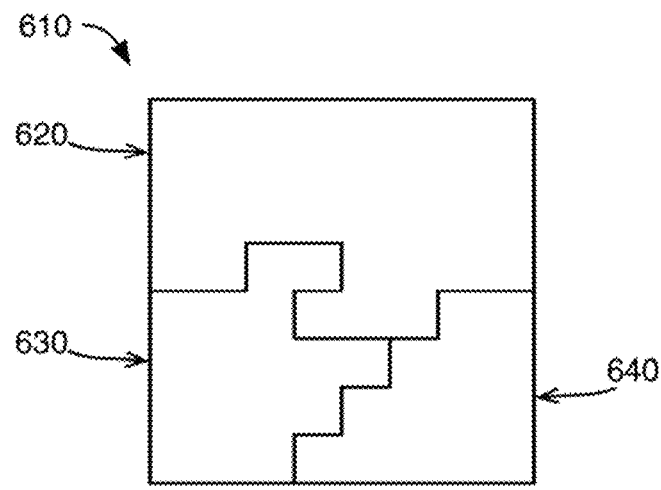
FIGS. 6(A) and 6(B) illustrate an example video frame segmented into region layers and partitioned according to tiles into super-fragments.
Figure 6B:
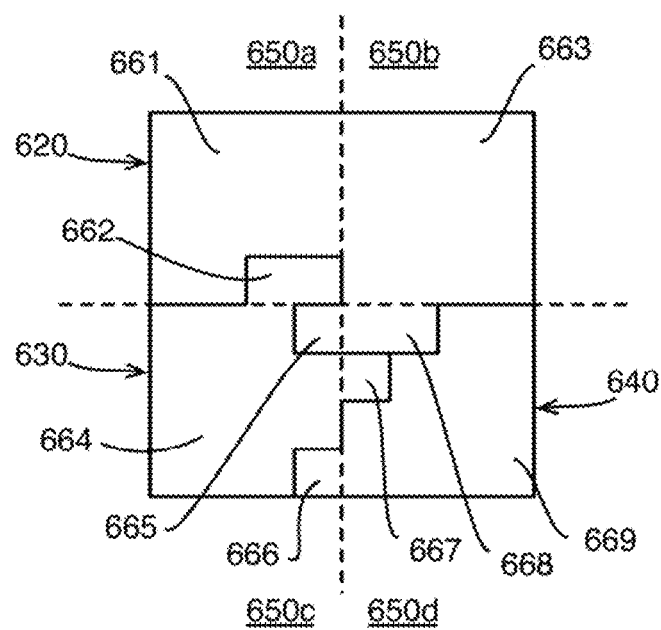

FIGS. 6(A) and 6(B) illustrate an example video frame 610 segmented into region layers 620, 630, 640, and partitioned according to tiles 650a-650d into super-fragments 661-669, arranged in accordance with at least some implementations of the present disclosure. As shown in FIG. 6(A) and as discussed above, video frame 610 (a portion of a video frame is illustrated for the sake of clarity of presentation) may be segmented into region layers 620, 630, 640 as discussed above using any suitable technique, such as, for example, a symbol-run coding via partitions generator module 105 or adaptive picture organizer module 104. In some examples, region layers 620, 630, 640 may represent a fore-ground, a back-ground, and a middle-ground of a scene or the like. As shown in FIG. 6(B), region layers 620, 630, 640 may be overlaid or combined or the like with tiles 650a-650d, which may be defined with respect to video frame 610 as described above (e.g., video frame 610 may be divided into ties 650a-650d), to define super-fragments 661-669 such that each of super-fragments 661-669 may include portions of a tile in or within a region layer.

For example, super-fragment 661 may include the portion of tile 650a in or within region layer 620, super-fragment 662 may include the portion of tile 650a in or within region layer 630, super-fragment 663 may include the portion of tile 650b in or within region layer 620 (e.g., all of tile 650b), super-fragment 664 may include the portion of tile 650c in or within region layer 630, super-fragment 665 may include the portion of tile 650c in or within region layer 620, super-fragment 666 may include the portion of tile 650c in or within region layer 640, super-fragment 667 may include the portion of tile 650d in or within region layer 630, super-fragment 668 may include the portion of tile 650d in or within region layer 620, and super-fragment 669 may include the portion of tile 650d in or within region layer 640. It is noted that in FIG. 6(B), super-fragment boundaries are defined by both solid lines representing region layer boundaries and hatched lines representing tile boundaries.

As discussed, frame portions may be defined by dividing a video frame into tiles, or coding unit, or defining super-fragments. In some examples, using tiles may offer the advantages of simplicity while super-fragments may be more complex but may offer the advantage of enhanced inter- or intra-prediction or image enhancement. In either case, the frame portions may be partitioned as discussed herein.

As is discussed further below, the segmentation of video frame 310 into tiles, or coding unit, or super-fragments may be performed by prediction partitions generator module 105 (or a tile, coding unit, or super-fragment generator module of prediction partitions generator module 105, for example), another module (e.g., a tile, coding unit, or super-fragment generator module) inserted between adaptive picture organizer 104 prediction partitions generator 105, or by adaptive picture organizer module 104 (or a tile, coding unit, or super-fragment generator module of adaptive picture organizer module 104, for example).

FIG. 7 is a flow diagram showing a subset of an example encoding process 700, arranged in accordance with at least some implementations of the present disclosure. Process 700 may include one or more operations, functions or actions as illustrated by one or more of operations 702, 704-706, and/or 708. Process 700 may form at least part of a next generation video coding process. By way of non-limiting example, process 700 may form at least part of a next generation video encoding process as undertaken by encoder system 100 of FIG. 1.

Process 700 may begin at operation 702, "Receive a Video", where a video frame may be received. The video frame may be any video frame as discussed herein Process 700 may continue at operation 704, "Segment the Video Frame into Tiles, Coding Units, or Super-Fragments", where the video frame may be segmented into tiles, coding units, or super-fragments using any technique(s) as discussed herein.

Process 700 may continue at operation 706, "Determine a Chosen Prediction Partitioning Technique (e.g., K-d Tree or Bi-Tree Partitioning) for a Tile, Coding Unit, or Super-Fragment", where the chosen partitioning technique may be determined for a frame portion (e.g., a tile, coding unit, or super-fragment). In some examples, the chosen partitioning technique may be based at least in part on a picture type of the video frame. As discussed, in some examples, the partitioning technique for the frame portion may be a structured partitioning technique chosen from bi-tree partitioning or k-d tree partitioning. For example, a structure partitioning technique may provide for a partitioning that results in organized data that may be efficiently encoded via a bitstream. For example, bi-tree partitioning or k-d tree partitioning may provide for a bit-wise coding including a 0 for no cut and a 1 for a cut, followed by a 0 or 1 indicating a horizontal or vertical cut, and repeating the pattern for the cuts until a termination (e.g., a no cut). Such structured partitionings may also be efficiently coded using codebook techniques as discussed herein.

As discussed, in some examples, the chosen partitioning technique may be determined based on a picture type of the video frame. For example, as discussed, a video frame may be an I-picture, a P-picture, or an F/B-picture. In some examples, for video frames that are I-pictures, the chosen partitioning technique may be the k-d tree partitioning technique. Further, in such examples, the frame portion may comprise a tile size of 64×64 pixels or a super-fragment determined based on a tile size of 64×64 pixels. In some examples, for video frames that are P-pictures, the chosen partitioning technique may be the bi-tree partitioning technique. Further, in such examples, the frame portion may comprise a tile size of 32×32 pixels or a super-fragment determined based on a tile size of 32×32 pixels for low-resolution P-pictures or the frame portion may comprise a tile size of 64×64 pixels or a super-fragment determined based on a tile size of 64×64 pixels for high-resolution P-pictures. In some examples, for video frames that are F-pictures, the chosen partitioning technique may be the bi-tree partitioning technique. Further, in such examples, the frame portion may comprise a tile size of 64×64 pixels or a super-fragment determined based on a tile size of 64×64 pixels.

In other examples, the chosen partitioning technique may be based at least in part on a characteristic of the tile, coding unit, or super-fragment (e.g., the frame portion). For example, the characteristic may include an expected amount of intra-blocks in the at least one frame portion. The expected amount of intra-blocks may be determined via prediction partitions generator 105 or encode controller 103, for example. In some examples, the chosen partitioning technique may be the k-d tree partitioning technique when the expected amount of intra-blocks is greater than a threshold and the chosen partitioning technique may include the bi-tree partitioning technique when the expected amount of intra-blocks is less than a threshold.

Process 700 may continue at operation 708, "Partition the Tile, Coding Unit, or Super-Fragment into a Plurality of Potential Prediction Partitions Using the Chosen Prediction Partitioning Technique", where the frame portion may be partitioned into a plurality of partitions using the chosen partitioning technique. For example, the frame portion (e.g., a tile, coding unit, or a super-fragment) may be partitioned using the chosen partitioning technique (e.g., chosen from k-d tree partitioning or bi-tree partitioning). For example, the frame portion may be partitioned by prediction partitions generator module 105 of encoder 100. For example, the frame portion may be partitioned into a plurality of potential prediction partitions, which may be evaluated by a rate distortion optimization or the like to select a selected prediction partitions, which may be used for the coding discussed herein. Further, the selected prediction partitions (e.g., a selected partitioning) may be represented as discussed herein via coding partitioning indicators or codewords, which may be coded into a bitstream such as bitstream 111 or bitstream 1000 or the like.

As discussed above, depending on, for example, a picture type of a frame or a characteristic of a frame portion, the frame portion may be partitioned using a chosen partitioning technique chosen from bi-tree partitioning or k-d tree partitioning. Further, as discussed above, the frame portion may be a tile, coding unit, or a super-fragment or the like and the frame portion may have substantially any shape (e.g., particularly when super-fragments are employed). For the sake of clarity of presentation, bi-tree partitioning and k-d tree partitioning will be described with respect to a square tile, coding unit, or super-fragment. However, the described techniques may be applied to any shape of tile, coding unit, or super-fragment. In some examples, the described partitioning may partition to a smallest allowable size such as, for example 4×4 pixels or the like.

Figure 8:
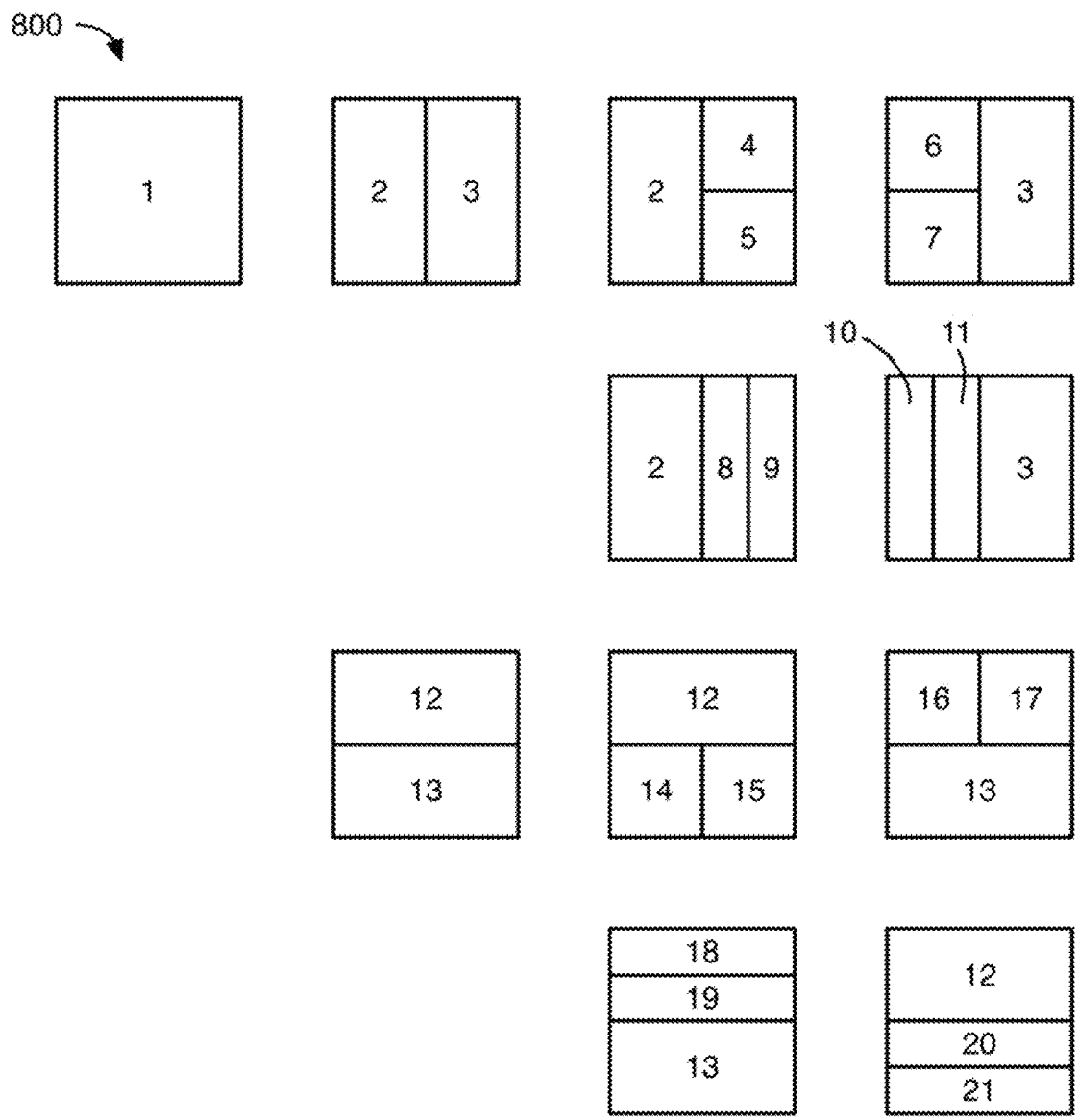
FIG. 8 illustrates example partitioning of a frame portion using a bi-tree partitioning technique.

FIG. 8 illustrates example partitioning of a frame portion 800 using a bi-tree partitioning technique, arranged in accordance with at least some implementations of the present disclosure. As shown, in some examples, frame portion 800 may include a square shape. As discussed, in various examples, frame portion 800 may include any suitable shape. Further, frame portion 800 may include a tile, coding unit, or a super-fragment or the like as discussed herein. Further, in some examples, frame portion 800 may itself be a partition such that the illustrated partitions may be considered sub-partitions. Such examples may occur when partitions are further partitioned for coding (e.g., transform coding) via sub-partitions generator module 107 as will be further discussed herein below.

As shown in FIG. 8, bi-tree partitioning may include a progression of partitioning. Beginning with frame portion 800, a partition 1 may be defined as frame portion 800 itself. Partition 1 may be vertically partitioned into two partitions 2, 3. Each of partitions 2, 3, may be further partitioned, this time vertically into partitions 4, 5 (e.g., partitions of partition 3) and partitions 6, 7 (e.g., partitions of partition 2). The second row (from the top) of FIG. 8 illustrates further vertical partitioning of partition 3 into partitions 8, 9 and further vertical partitioning of partition 2 into partitions 10, 11. The third row (from the top) of FIG. 8 illustrates horizontal partitioning (e.g., instead of the vertical partitioning of the first row (from the top)) to generate partitions 12, 13 from partition 1. The third row (from the top) of FIG. 8 also illustrates further vertical partitioning of partitions 12, 13 to generate partitions 14, 15 (e.g., partitions of partition 13) and partitions 16, 17 (e.g., from partitions of partition 12). The fourth or bottom row illustrates further horizontal partitioning of partition 12 to generate partitions 18, 19 and of partition 13 to generate partitions 20, 21. As illustrated, bi-tree partitioning may be used recursively, one dimension at a time (e.g., horizontally and vertically) to subdivide or partition each partition into two equal partitions until the smallest partition size may be reached. Bi-tree partitioning may partition a frame portion into a wide number of combinations and may provide for a smooth progression of partitions.

FIG. 9 illustrates example partitioning of a frame portion 900 using a k-d tree partitioning technique, arranged in accordance with at least some implementations of the present disclosure. As shown, in some examples, frame portion 900 may include a square shape. As discussed, in various examples, frame portion 900 may include any suitable shape. Further, frame portion 900 may include a tile, coding unit, or a super-fragment or the like as discussed herein.

As shown in FIG. 9, k-d tree partitioning may include a progression of partitioning. Further, as illustrated, k-d tree partitioning may be a superset of bi-tree partitioning such that rows 1-4 of FIG. 9 (beginning from the top of FIG. 9) may match rows 1-4 of FIG. 8. In some examples, the process of k-d tree partitioning illustrated in FIG. 9 may divide frame portion 900 iteratively into four rectangular partitions in a particular dimension (e.g., vertical or horizontal). Beginning with frame portion 900, a partition 1 may be defined as frame portion 900 itself. Partition 1 may be vertically partitioned into two partitions 2, 3. Each of partitions 2, 3, may be further partitioned, this time vertically into partitions 4, 5 (e.g., partitions of partition 3) and partitions 6, 7 (e.g., partitions of partition 2). The second row (from the top) of FIG. 9 illustrates further vertical partitioning of partition 3 into partitions 8, 9 and further vertical partitioning of partition 2 into partitions 10, 11. The third row (from the top) of FIG. 9 illustrates horizontal partitioning (e.g., instead of the vertical partitioning of the first row (from the top)) to generate partitions 12, 13 from partition 1. The third row (from the top) of FIG. 9 also illustrates further vertical partitioning of partitions 12, 13 to generate partitions 14, 15 (e.g., partitions of partition 13) and partitions 16, 17 (e.g., from partitions of partition 12). The fourth row (from the top) illustrates further horizontal partitioning of partition 12 to generate partitions 18, 19 and of partition 13 to generate partitions 20, 21.

As discussed, through the fourth row, k-d tree partitioning may substantially match bi-tree partitioning. As illustrated at the fifth row (from the top) of FIG. 9, frame portion 900 may be partitioned into ¼ and ¾ size partitions vertically to generate partitions 22, 23. Further, partition 23 may be partitioned in half vertically to generate partitions 24, 25 and partition 22 may be partitioned in half vertically to form partitions 26, 27. As illustrated at the sixth or bottom row of FIG. 9, frame portion 900 may be partitioned into ¼ and ¾ size partitions horizontally to generate partitions 28, 29. Further, partition 28 may be partitioned in half horizontally to generate partitions 30, 31 and partition 29 may be partitioned in half horizontally to form partitions 32, 33. Such a partitioning process may be repeated recursively, alternating dimensions (e.g., horizontal and vertical) to subdivided or partition each partition into 2 equal parts (halves) and 2 unequal parts (e.g., at a ration of 1:3) until the smallest partition size may be reached. K-d tree partitioning may partition a frame portion into a wide number of combinations not only at a midpoint of the partitions and sub-partitions (and so on) but also with further accuracy on each access. In the illustrated example, one-quarter accuracy is used. In other examples, any accuracy may be used such as one-third or one fifth or the like may be used.

As discussed with respect to FIGS. 8 and 9, frame portions may be partitioned into a wide range of partitions. The partitions may each be indexed with an index value and transmitted to encode controller 103 (please refer to FIG. 1). The indexed and transmitted partitions may include hundreds of partitions, for example. One or more partitions may be used as discussed with respect to FIG. 1 for prediction and/or coding (e.g., transform coding; in some examples, partitions for coding may be further partitioned into sub-partitions). For example, I-pictures may be predicted entirely using intra-prediction, P-pictures may use inter- and intra-prediction, although inter-prediction may be the main source of prediction for P-pictures, and F/B-pictures may also use both inter- and intra-prediction. For example, encode controller 103 may select partitions for use in inter-prediction and intra prediction operations. Data associated with the inter- and/or intra-prediction and data defining the utilized partitions may be encoded in a bitstream, for example, as is discussed further herein below.

In some examples, the wide range of partitioning options may be limited or constrained. Such a constraint may be applied in either bi-tree or k-d tree partitioning examples. For example, partitioning the frame portion (e.g., the tile, coding unit, or super-fragment) may include pre-defining a first partition as halving frame portion in a first dimension (e.g., horizontal or vertical) and pre-defining a second partition as halving the at least one frame portion in a second dimension (e.g., the opposite of the first halving). Further partitions may be made only after such initial constrained partitioning, for example, such that other optional partitions based on the initial frame portion will no longer be available. Such constraints may provide for beginning with 64×64 pixel frame portions and dividing the frame portion into 32×32 size sub-portions and then partitioning each sub-portion by k-d tree or bi-tree partitioning, which may limit or the number of partitions.

The prediction partitions and/or coding partitions may be defined (e.g., their shape and/or location may be defined) for use by the encoder and/or decoder In some examples, an individual prediction partition of a frame portion or a coding partition of a prediction partition may be defined using symbol-run coding based on pixel blocks. In other examples, an individual prediction partition of a frame portion or a coding partition of a prediction partition may be defined using a code book. Table 1, illustrates an example bi-tree partitioning codebook of entries with fragment size of 32×32 pixels for use in defining a partition of a tile, coding unit, or a super-fragment. In table 1, the large Xs represent nonterminating partitions.

TABLE 1

Example of bi-tree partitioning codebook entries

| Index | Shape | Number of Partitions |
|---|---|---|
| 0 |  | 1 |
| 1 |  | 2 |
| 2 |  | 2 |

TABLE 1-continued

Example of bi-tree partitioning codebook entries

| Index | Shape | Number of Partitions |
|---|---|---|
| 3 |  | 3 |
| 4 |  | 3 |
| 5 |  | 3 |
| 6 |  | 3 |
| 7 |  | 3 |
| 8 |  | 3 |
| 9 |  | 3 |

TABLE 1-continued

Example of bi-tree partitioning codebook entries

| Index | Shape | Number of Partitions |
|---|---|---|
| 10 |  | 3 |

Table 2, illustrates an example k-d tree partitioning codebook of entries with fragment size of 32×32 pixels for use in defining a partition of a tile, coding unit, or a super-fragment.

TABLE 2

Example of k-d tree partitioning codebook entries

| Index | Shape | Number of Partitions |
|---|---|---|
| 0 |  | 1 |
| 1 |  | 2 |
| 2 |  | 2 |
| 3 |  | 2 |
| 4 |  | 2 |
| 5 |  | 2 |
| 6 |  | 2 |
| 7 |  | 3 |
| 8 |  | 3 |
| 9 |  | 3 |
| 10 |  | 3 |
| 11 |  | 3 |

TABLE 2-continued

Example of k-d tree partitioning codebook entries

| Index | Shape | Number of Partitions |
|---|---|---|
| 12 | 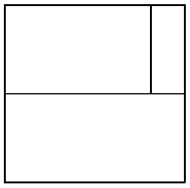 | 3 |

Tables 1 and 2 only show example codebook entries. A full codebook of entries may provide a full or substantially full listing of all possible entries and coding thereof. In some examples, the codebook may take into account constraints as described above. In some examples, data associated with a codebook entry for a partition (or sub-partition) may be encoded in a bitstream for use at a decoder as discussed herein.

As discussed, frame portions (e.g., tiles, coding units, or super-fragments) may be partitioned based on a chosen partitioning technique (e.g., bi-tree partitioning or k-d tree partitioning) to generate prediction partitions. The prediction partitions may be used for encoding based on inter-prediction techniques and/or intra-prediction techniques. A local decode loop implemented via the encoder may generate predicted partitions, which may be used to generate prediction error data partitions or residuals (e.g., differences between predicted partitions and original pixel data). In some instances, the prediction error data partitions associated with the prediction partitions may be coded and they may therefore be described as prediction partitions or coding partitions substantially interchangeably. Such instances may occur in the context of intra-prediction in I-pictures (or, in some implementations in the context of intra-prediction in P- and F/B-pictures) for example. In other instances (e.g., in P- and F/B-pictures), the prediction error data partitions may be evaluated to determine whether they need to be encoded and, if so, the associated partitions may be further partitioned into coding partitions for coding. Further, the prediction partitions and/or coding partitions may be characterized or defined using symbol-run coding or a codebook or the like. Also as discussed, data associated with the described prediction partitions and/or coding partitions, prediction data and so on may be encoded (e.g., via an entropy encoder) into a bitstream. The bitstream may be communicated to a decoder, which may use the encoded bitstream to decode video frames for display.

FIG. 10 illustrates an example bitstream 1000, arranged in accordance with at least some implementations of the present disclosure. In some examples, bitstream 1000 may correspond to output bitstream 111 as shown in FIG. 1 and/or input bitstream 201 as shown in FIG. 2. Although not shown in FIG. 10 for the sake of clarity of presentation, in some examples bitstream 1000 may include a header portion and a data portion. In various examples, bitstream 1000 may include data, indicators, codewords, index values, mode selection data, reference type data, or the like associated with encoding a video frame as discussed herein. As shown, in some examples, bitstream 1000 may include coding partition defining data 1010, prediction error data partition encoded data 1020 (e.g., prediction error data that has been transform coded and quantized), prediction partition defining data 1030, inter-prediction data 1040, prediction partition defining data 1050, and/or intra-prediction data 1060. The illustrated data may be included in any order in bitstream 1000 and may be adjacent or separated by any other of a variety of additional data for coding video.

For example, coding partition defining data 1010 may include data associated with coding partitions defined via coding partitions generator 107. For example, coding partition defining data 1010 may include data associated with defining bi-tree partitions using a symbol-run coding or codebook technique or the like such as coding partition indicators or codewords or the like. Further, coding partition defining data 1010 may be associated with prediction error data partition encoded data 1020 generated via adaptive transform module 108 and or adaptive entropy encoder module 110. Prediction error data partition encoded data 1020 (e.g., transform coefficients or the like) may include transform encoded and quantized residual data. Prediction error data partition encoded data 1020 may be transmitted via bitstream 1000 for decoding.

Prediction partition defining data 1030 may include data associated with prediction partitions defined via prediction partitions generator 105, for example. Prediction partition defining data 1030 may include data associated with defining either bi-tree partitions or k-d tree partitions, as discussed herein. Prediction partition defining data 1030 may define partitions associated with inter-prediction data or intra-prediction data in various examples. For example, prediction partitions defining data 1030 may include data associated with defining bi-tree partitions or k-d tree partitions using a symbol-run coding or codebook technique or the like such as prediction partition indicators or codewords or the like. In some examples, prediction partition defining data 1030 may be associated with inter-prediction data 1040 such that inter-prediction data 1040 may be configured to provide inter-predication (e.g., motion compensation or the like) for the partition defined by partition defining data 1030.

Prediction partition defining data 1050 may include data associated with prediction partitions defined via prediction partitions generator 105, for example. Prediction partition defining data 1050 may include data associated with defining either bi-tree partitions or k-d tree partitions, as discussed herein. In some examples, prediction partition defining data 1030 and prediction partition defining data 1050 may define prediction partitions in the same frame. In other examples, prediction partition defining data 1030 and prediction partition defining data 1050 may define partitions in different frames. Prediction partition defining data 1050 may define prediction partitions associated with inter-prediction data or intra-prediction data in various examples. For example, prediction partitions defining data 1050 may include data associated with defining bi-tree partitions or k-d tree partitions using a symbol-run coding or codebook technique or the like. In some examples, prediction partition defining data 1050 may be associated with intra-prediction data 1060 such that intra-prediction data 1060 may be configured to provide intra-predication for the prediction partition defined by prediction partition defining data 1050. In some examples, intra-prediction data 1060 may be generated by prediction analyzer and prediction fusion filtering module 124 or the like.

As discussed, bitstream 1000 may be generated by an encoder such as, for example, encoder 100 and/or received by a decoder 200 for decoding such that video frames may be presented via a display device.

FIG. 11 is a flow diagram showing an example decoding process 1100, arranged in accordance with at least some implementations of the present disclosure. Process 1100 may include one or more operations, functions or actions as illustrated by one or more of operations 1102, 1104, 1106, 1108, 1109, 1110, 1112, and/or 1114. Process 1100 may form at least part of a next generation video coding process. By way of non-limiting example, process 1100 may form at least part of a next generation video decoding process as undertaken by decoder system 200 of FIG. 2.

Process 1100 may begin at operation 1102, "Receive Encoded Bitstream", where a bitstream may be received. For example, a bitstream encoded as discussed herein may be received at a video decoder. In some examples, bitstream 1000 may be received via decoder 200.

Process 1100 may continue at operation 1104, "Decode the Entropy Encoded Bitstream to Determine Prediction Coding Indicators, Prediction Modes, Prediction Reference Types, Prediction Parameters, Motion Vectors, Coding Partition Indicator(s), Block Size Data, Transform Type Data, Quantizer (Qp), and Quantized Transform Coefficients", where the bitstream may be decoded to determine coding partition indicators (or codewords), block size data, transform type data, quantizer (Qp), and quantized transform coefficients. For example, the decoded data may include data associated with a coding partition (e.g., transform coefficients) and one or more indicators associated with the coding partition. For example, the transform coefficients may be for a fixed transform or a content adaptive transform as discussed herein. The transform type data may indicate a transform type for the coding partition, a parametric transform direction (e.g., for hybrid parametric transforms), and/or a transform mode (e g, xmmode; used only for intra coding signals between mode choices of using a prediction difference signal or an original signal). In some examples, the decoding may be performed by adaptive entropy decoder module 202. In some examples, determining the transform coefficients may also involve an inverse quantization operation. In some examples, the inverse quantization operation may be performed by adaptive inverse quantize module 203.

In some examples, the bitstream may be entropy decoded to determine inter-prediction data associated with a first individual prediction partition, data defining the first individual prediction partition, intra-prediction data associated with the second individual prediction partition, data defining the second individual prediction partition, and data associated with individual prediction error data partition. For example, the first individual prediction partition may include a bi-tree partition and the second individual prediction partition may include a k-d tree partition as discussed herein. In some examples, the bitstream may be entropy decoded to further determine data associated with an individual prediction error data partition as discussed herein.

Process 1100 may continue at operation 1106, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 1106 may be applied via adaptive inverse quantize module 203. For example, the data associated with individual prediction error data partition may be inverse quantized to generate decoded coefficients.

Process 1100 may continue at operation 1108, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse size adaptive transform. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data. Any forward transform used for encoding as discussed herein may be used for decoding using an associated inverse transform. In some examples, the inverse transform may be performed by adaptive inverse transform module 204. In some examples, generating the decoded prediction error partitions may also include assembling decoded coding partitions via coding partitions assembler 205.

For example, the data associated with individual prediction error data partition (e.g., decoded coefficients) may be inverse transformed to generate a prediction error data partition (e.g. error data for a prediction partition) or decoded coding partitions that may be combined or assembled to generate a prediction error data partition. In some examples, an inverse quantization and an inverse transform may be performed based on the data associated with the individual prediction error data partition to generate decoded coding partitions (e.g., decoded coding partitions of the prediction error data partition). In some examples, the coding partitions may be bi-tree coding partitions of the prediction error data partition as discussed.

Process 1100 may continue at operation 1109, "Using Prediction Partition Indicators, Prediction Modes, Prediction Reference Types, and Motion Vectors Generate Predicted Partitions", where, the prediction partition indicators, prediction modes, prediction reference types, and motion vectors may be used (along with prediction reference pictures) to generate predicted partitions (e.g., pixel data for or associated with prediction partitions).

Process 1100 may continue at operation 1110, "Add Corresponding Predicted Partitions to the Decoded Prediction Error Data Partitions to Generate Reconstructed Partitions", where (decoded) predicted partitions my be added to the decoded prediction error data partitions to generate reconstructed prediction partitions. For example, the decoded prediction error data partition may be added to the associated predicted partition via adder 206. In some examples, a reconstructed partition may be generated by performing inter- or intra-prediction (e.g., a previously decoded partition or the like may be used via inter- or intra-prediction to generate a predicted partition). In some examples, motion compensation may be performed to generate a decoded individual predicted partition based on inter-prediction data (e.g., motion vectors) decoded from the bitstream. In some examples, intra-prediction may be performed for a decoded individual predicted partition based on the intra-prediction data decoded from the bitstream.

Process 1100 may continue at operation 1112, "Assemble Reconstructed Partitions to Generate a Tile, Coding Unit, or Super-Fragment", where the reconstructed prediction partitions may be assembled to generate tiles, coding units, or super-fragments. For example, the reconstructed prediction partitions may be assembled to generate tiles, coding units, or super-fragments via prediction partitions assembler module 207.

Process 1100 may continue at operation 1114, "Assemble Tiles, Coding Units, or Super-Fragments of a Picture to Generate a Full Decoded Picture", where the tiles, coding units, or super-fragments of a picture may be assembled to generate a full decoded picture. For example, after optional deblock filtering and/or quality restoration filtering, tiles, coding units, or super-fragments may be assembled to generate a full decoded picture, which may be stored via decoded picture buffer 210 and/or transmitted for presentment via a display device after processing via adaptive picture re-organizer module 217 and content post-restorer module 218.

Various components of the systems described herein may be implemented in software, firmware, and/or hardware and/or any combination thereof. For example, various components of system 300 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

Figure 12A:
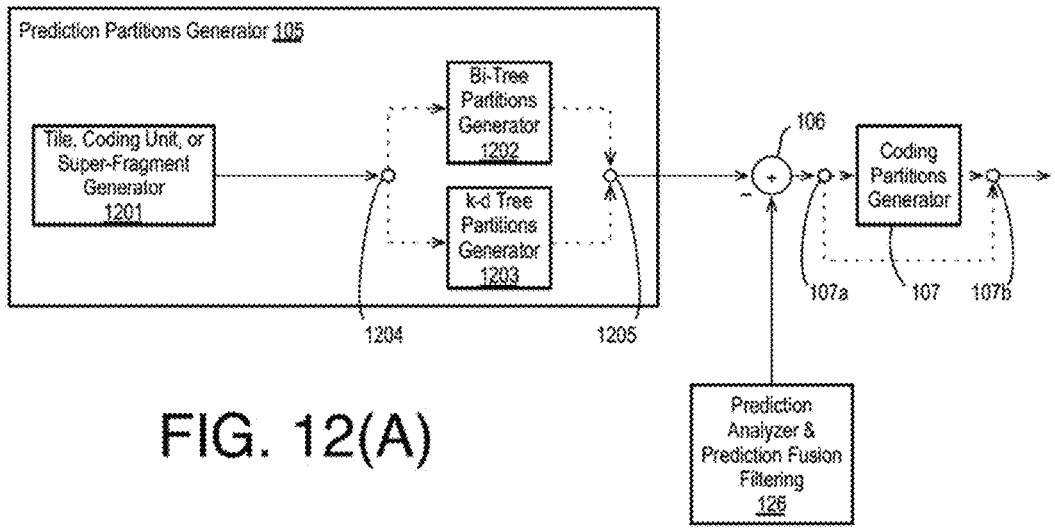
FIGS. 12(A) and 12(B) are illustrative diagrams of example encoder subsystems.
Figure 12B:
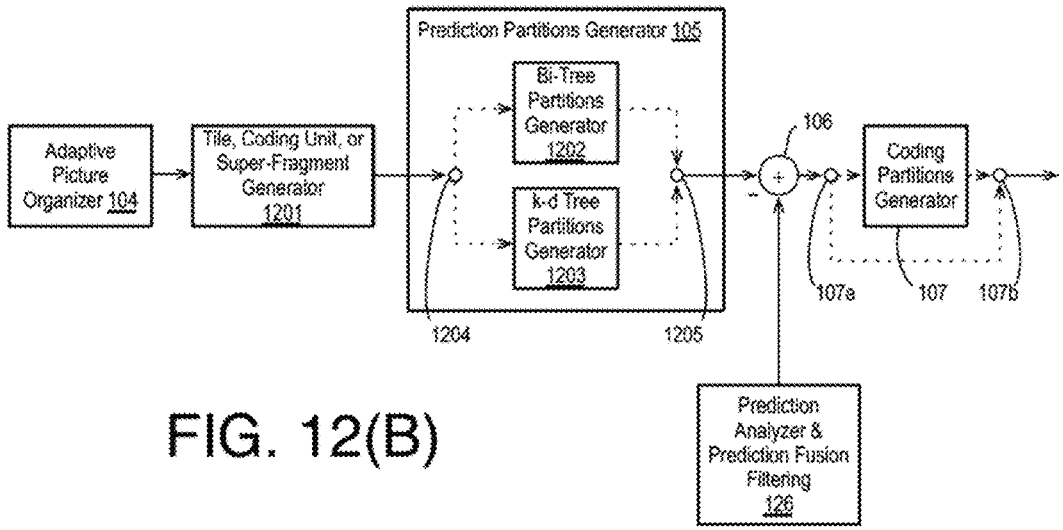

FIGS. 12(A) and 12(B) are illustrative diagrams of example encoder subsystems 1200 and 1210, arranged in accordance with at least some implementations of the present disclosure. In some examples, encoder subsystem 1200 or 1210 may be implemented via encoder 100 as shown in FIG. 1. As shown in FIG. 12(A), encoder subsystem 1200 may include prediction partitions generator module 105, as discussed above. As shown, in some examples, prediction partitions generator module 105 may include a tile, coding unit, or super-fragment generator module 1201, which may generate tiles, or coding unit, or super-fragments as discussed herein.

As shown in FIG. 12(B), encoder subsystem 1210 may include a separate tile, coding unit, or super-fragment generator module 1201 implemented between adaptive picture organizer 104 (which may not be considered a part of encoder subsystem 1210 in some implementations) and prediction partitions generator 105. In other examples, separate tile, coding unit, or super-fragment generator module 1201 may be implemented via adaptive picture organizer 104 and adaptive picture organizer 104 may be considered a part of the encoder subsystem.

As discussed, in some examples, super-fragments may be coded. In some examples, the super-fragments may be coded by symbol run coding that that may utilize correlation among neighboring blocks along a one-dimensional (1D) scan as likely the neighboring blocks belong to the same region. In other examples, a codebook may be used to approximate the frame portion boundaries on an equally or substantially equally spaced tile grid of 32×32 pixels or 64×64 pixels or the like. In such examples, the main boundaries through each tile may be approximated with a closest pattern available from a codebook and a code corresponding to the pattern may be included in a bitstream for use by a decoder. In some examples, such boundary representations may be lossy in order to minimize the bit cost.

In various implementation, frame portions (e.g., tiles, coding units, or super-fragments) may be generated by or transmitted to prediction partitions generator module 105, which may include bi-tree partitions generator module 1202 and k-d tree partitions generator module 1203. As shown, frame portions may be input into either bi-tree partitions generator module 1202 or k-d tree partitions generator module 1203 depending on the operation of switches 1204, 1205. In some examples, switches 1204, 1205 may operate based on a picture type of the frame of the frame portions. For example, if the frame is an I-Picture, the received frame portion may be input into k-d tree partitions generator module 1203 via switches 1204, 1205. If the frame is a P- or F/B-picture, the received frame portion may be input into bi-tree partitions generator module 1202 via switches 1204, 1205, for example. In other examples, switches 1204, 1205 may operate based on a characteristic of the received frame portion. For example, if the expected amount of intra-blocks of the frame portion is greater than a threshold, the frame portion may be input into k-d tree partitions generator module 1203 and if the expected amount of intra-blocks of the frame portion is less than the threshold, the frame portion may be input into bi-tree partitions generator module 1202. In various examples, the threshold may be predefined, or heuristically determined or the like.

As shown, the output of prediction partitions generator module 105 (as controlled via switch 1205) may be input into differencer 106, where processing may continue as discussed above with respect to FIG. 1, such that the second input into differencer 106 is the output of prediction fusion analyzer and prediction fusion filtering module 126 and such that the output of differencer 106 (e.g., prediction error data partitions or residuals or the like) may be optionally input into coding partitions generator 107 as controlled via switches 107a, 107b as discussed herein. In some examples, for inter-prediction in F/B-pictures or P-pictures, prediction error data partitions may be transmitted to coding partitions generator module 107 for further partitioning into coding partitions (e.g., via a bi-tree portioning technique). In some examples, for intra-prediction in I-pictures, prediction error data partitions (or original pixel data) may bypass coding partitions generator module 107 such that no additional partitioning is performed prior to transform coding (e.g., via adaptive transform module 108). In such examples, frame portions (e.g., tiles, or coding unit, or super-fragments) may be partitioned only once and such partitions may be described as prediction partitions or coding partitions or both depending on context. For example, as output from prediction partitions generator, such partitions may be considered prediction partitions (as they are being used for prediction) while at adaptive transform module 108, such partitions may be considered coding partitions (as such partitions are being transform coded).

Figure 13:
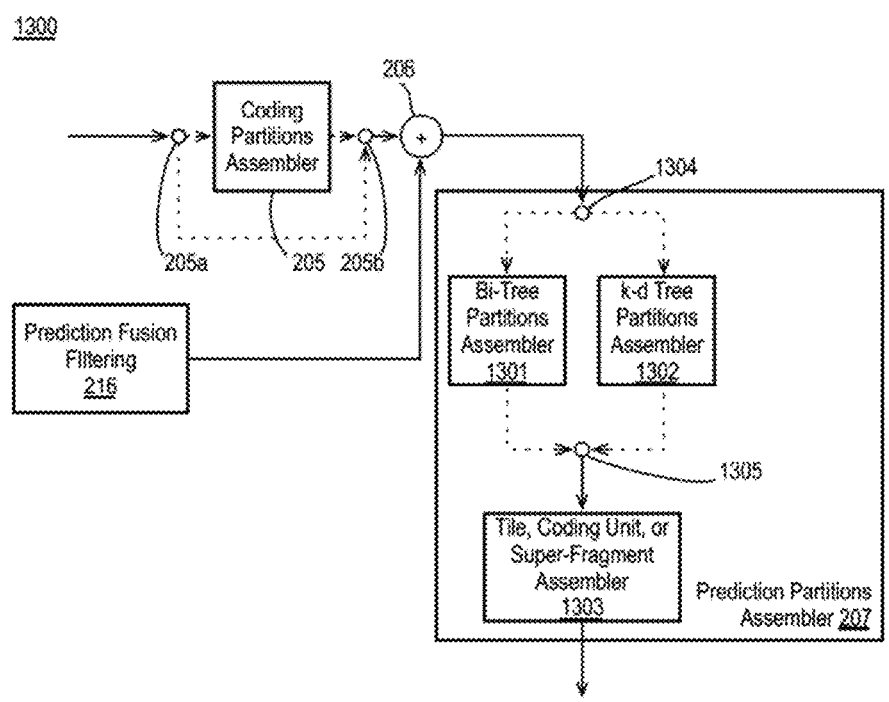
FIG. 13 is an illustrative diagram of an example decoder subsystem.

FIG. 13 is an illustrative diagram of an example decoder subsystem 1300, arranged in accordance with at least some implementations of the present disclosure. In some examples, decoder subsystem 1300 may be implemented via decoder 200 as shown in FIG. 2. As shown in FIG. 13, decoder subsystem 1300 may include coding partitions assembler module 205, which may optionally receive input from adaptive inverse transform module 204 (not shown, please refer to FIG. 2) as controlled via switches 205a, 205b. The output of coding partitions assembler module 205 or the bypassed data (e.g., prediction error data partitions) may be provided as an input to adder 206. As discussed, in some examples, prediction error data partitions may have been transform encoded without further partitioning (e.g., in intra-prediction of I-pictures) and coding partitions assembler module 205 may be bypassed and, in some examples, prediction error data partitions may have been further partitioned into coding partitions for transform coding and coding partitions assembler module 205 may assemble such coding partitions into prediction error data partitions.

The second input to adder 206 (e.g., decoded prediction partitions) may be provided from the output of prediction fusion filtering module 216, as discussed above with respect to FIG. 2. As shown, decoder subsystem 1300 may also include prediction partitions assembler module 207, which may include bi-tree partitions assembler module 1301 and k-d tree partitions assembler module 1302. The output of adder 206 (e.g., reconstructed prediction partitions) may be input into either bi-tree partitions assembler module 1301 or k-d tree partitions assembler module 1302 based on the control of switches 1304, 1305. For example, bi-tree partitions may be input into bi-tree partitions assembler module 1301 for assembly into frame portions and k-d tree partitions may be input into k-d tree partitions assembler module 1302 for assembly into frame portions (e.g., according to the type of partitioning performed at the encoder).

Also as shown, in some examples, prediction partitions assembler module 207 may include a tile, coding unit, or super-fragment assembler module 1303, which may be configured to assemble the assembled frame portions (e.g., tiles, coding units, or super-fragments) into video frames. The output video frames of partitions assembler module 207 may be input into deblock filtering module 208 (not shown, please refer to FIG. 2) for further processing as discussed herein. In other examples, tile, coding unit, or super-fragment assembler module 1303 may be implemented separately between prediction partitions assembler module 207 and deblock filtering module 208 (please refer to FIG. 2).

Some additional and/or alternative details related to process 700, 1100 and other processes discussed herein may be illustrated in one or more examples of implementations discussed herein and, in particular, with respect to FIG. 14 below.

Figure 14A:
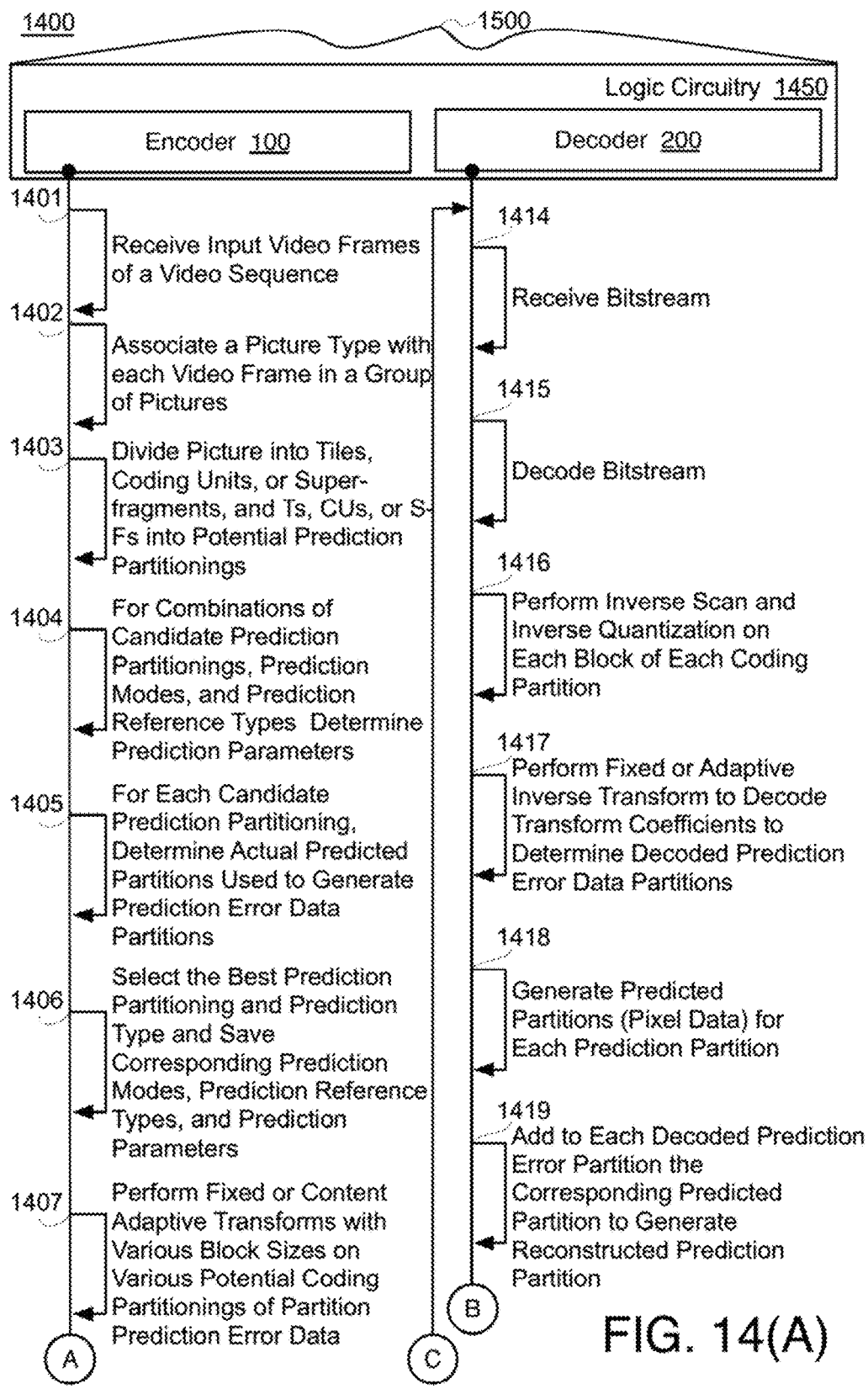
FIGS. 14(A) and 14(B) together provide a detailed illustration of a combined example of video encoding and decoding system and process.
Figure 14B:
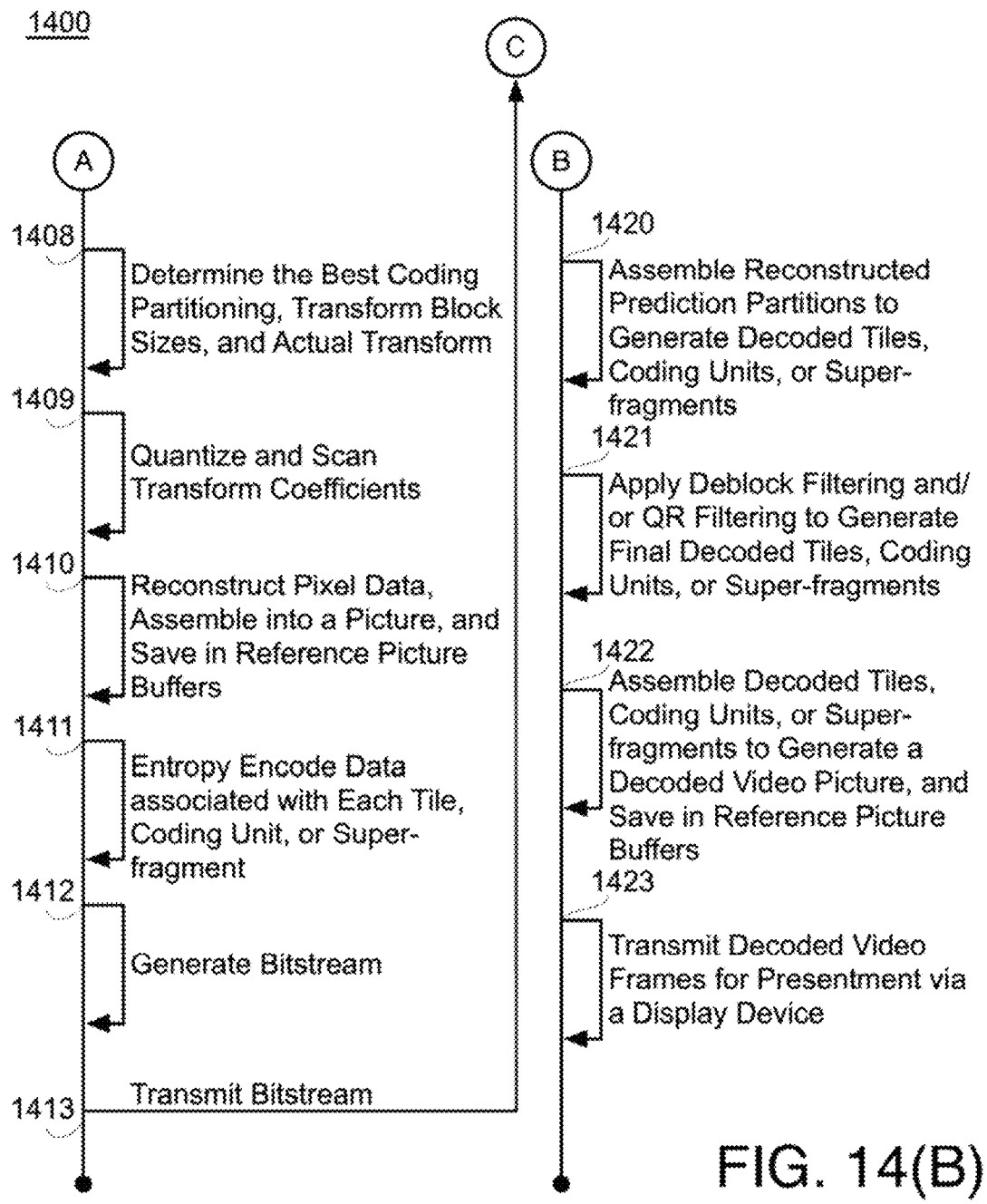

FIGS. 14(A) and 14(B) together provide a detailed illustration of a combined example of video encoding and decoding system 1500 and process 1400, arranged in accordance with at least some implementations of the present disclosure. In the illustrated implementation, process 1400 may include one or more operations, functions or actions as illustrated by one or more of actions 1401-1423. By way of non-limiting example, process 1400 will be described herein with reference to example video coding system 1500 including encoder 100 of FIG. 1 and decoder 200 of FIG. 2, as is discussed further herein below with respect to FIG. 20. In various examples, process 1400 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 1500 may include logic circuitry 1450, the like, and/or combinations thereof. For example, logic circuitry 1450 may include encoder 100 and may include any modules as discussed with respect to FIG. 1 (or FIG. 17) and/or FIGS. 3-6 and decoder 200 and may include any modules as discussed with respect to FIG. 2 and/or FIG. 18. Although video coding system 1500, as shown in FIGS. 14(A) and 14(B), may include one particular set of blocks or actions associated with particular modules, these blocks or actions may be associated with different modules than the particular modules illustrated here. Although process 1400, as illustrated, is directed to encoding and decoding, the concepts and/or operations described may be applied to encoding and/or decoding separately, and, more generally, to video coding.

Process 1400 may begin at operation 1401, "Receive Input Video Frames of a Video Sequence", where input video frames of a video sequence may be received via encoder 100 for example. The video frame may be any suitable video image, frame, picture, or data or the like for coding.

Process 1400 may continue at operation 1402, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1403-1411) may be performed on a frame or picture of a group of pictures and the processing may be repeated for all frames or pictures of a group and then repeated for all groups of pictures in a video sequence. Further, the video frame may be low resolution or high resolution.

Process 1400 may continue at operation 1403, "Divide a Picture into Tiles, Coding Units, or Super-fragments, and Tiles, Coding Units or Super-fragments into Potential Prediction Partitionings", where a picture may be divided into tiles, coding units, or super-fragments (e.g., frame portions as discussed) and the tiles, coding units, or super-fragments may be divided into potential prediction partitions via prediction partitions generator 105 for example. The potential prediction partitions may include bi-tree or k-d tree partitions as discussed herein. In some examples, the generated prediction partitions may be indexed with prediction partition index values. For example, the generated partitions (e.g., based on bi-tree or k-d tree partitioning) may each be indexed with index values 1, 2, 3, . . . , n. For example, the prediction partitions may be indexed at partitions generator module 105 of encoder 100 and the prediction partitions and the prediction partition index value may be transmitted to encode controller module 103.

Process 1400 may continue at operation 1404, "For Combinations of Candidate Prediction Partitionings, Prediction Modes, and Prediction Reference Types Determine Prediction Parameters", where, for combinations of each potential prediction partitionings (e.g., candidate prediction partitionings), prediction modes (e.g., intra, inter, multi, skip, auto, or split as discussed), and prediction reference types (e.g., the type of prediction reference picture—synthesized or morphed or original picture and various combinations of past or future versions of such pictures) prediction(s) may be performed and prediction parameters may be determined. For example, a range of potential prediction partitionings (each having various prediction partitions), potential modes, and potential reference types may be generated and the associated prediction(s), modes, and reference types may be determined. A best combination of such prediction partitions, modes (per prediction partition), and reference types (per prediction partition) may be determined using a rate distortion optimization or the like. For example, the prediction(s) may include prediction(s) using characteristics and motion based multi-reference predictions or intra-predictions or the like.

For example, for each prediction partition a mode (e.g., intra, inter, multi, skip, auto, or split as discussed) and a reference type (e.g., a reference picture chosen from a wide range of options based on past decoded pictures, future decoded pictures, and pictures based on such past and future decoded pictures including morphed pictures—e.g., pictures modified based on gain, registration, blur, or dominant motion—or synthesized pictures—e.g., pictures generated based on reference pictures using super resolution picture generation or projection trajectory picture generation. For example, the following tables illustrate example modes and example reference types available in those modes. Other examples may be used. In any event, for each prediction partition, a prediction mode indicator (e.g., indicating a selected mode for the prediction partition) and a reference type indicator (e.g., indicating a reference picture type, if needed) may be generated and encoded into a bitstream.

TABLE 3

Example Prediction Partition Modes

| Number | Prediction Partition Mode |
|---|---|
| 0 | Intra |
| 1 | Skip |
| 2 | Split |
| 3 | Auto |
| 4 | Inter |
| 5 | Multi |

TABLE 4

Example Reference Picture Types for P-Pictures in Inter Mode

| Number | Reference Types |
|---|---|
| 0 | MR0n (=past SR0) |
| 1 | MR1n |
| 2 | MR2n |
| 3 | MR3n |
| 4 | MR5n (Past SR1) |
| 5 | MR6n (Past SR2) |
| 6 | MR7n (Past SR3) |
| 7 | MR0d |
| 8 | MR0g |

TABLE 4

Example Reference Picture Types for F/B-Pictures in Inter Mode

| Number | Reference Types |
|---|---|
| 0 | MR0n |
| 1 | MR7n (=proj F) |
| 2 | MR3n (=future SR0) |
| 3 | MR1n |
| 4 | MR4n (FutureSR1) |
| 5 | MR5n (Future SR2) |
| 6 | MR6n (Future SR3) |
| 7 | MR0d |
| 8 | MR3d |
| 9 | MR0g/MR3g |

In Tables 3 and 4, the nomenclature for naming Reference Picture Types is as follows: the leading MR stands for Multiple References, SR stands for Super Resolution, and F stands for future, the next number indicates a counter for the reference with 0 indicating immediately previous, 1 the next previous, 2 the next previous, 3 the next previous, 4 the first future, 5 newly generated super resolution picture based on 1, 6 newly generated super resolution picture based on 2, 7 newly generated super resolution picture based on 3, and the lower case following letter indicates n for no change, g for morphing based on gain, d for morphing based on dominant motion, and b for morphing based on blur. As discussed, the references provided in Tables 3 and 4 provide only example references (e.g., not all mathematically possible combinations) and, for example, only the most advantageous combinations of references based on the picture type and mode. Such combinations may generate a codebook by which the encoder and decoder may communicate the chosen reference from the available types.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures (an example of which is provided in Table 3), and up to 10 reference types may be supported for F/B-pictures (an example of which is provided in Table 4). Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, the bitstream (discussed below with respect to operation 1412) may include a frame reference, morphing parameters, or synthesizing parameters associated with the prediction partition. The combination of generated predicted partitions using 2 (e.g. multi) references may be based on an average, a weighted average, or the like.

Process 1400 may continue at operation 1405, "For Each Candidate Prediction Partitioning, Determine Actual Predicted Partitions Used to Generate Prediction Error Data Partitions", where, for each candidate prediction partitioning, actual predicted partitions may be generated. For example, for each candidate prediction partitioning and modes and reference types (and associated prediction partitions, prediction(s), and prediction parameters), a prediction error may be determined. For example, determining the potential prediction error may include differencing original pixels (e.g., original pixel data of a prediction partition) with prediction pixels. As discussed, in some examples, the prediction error data partition may include prediction error data generated based at least in part on a previously decoded frame generated using at least one of a morphing technique or a synthesizing technique.

Process 1400 may continue at operation 1406, "Select the Best Prediction Partitioning and Prediction Type and Save Corresponding Prediction Modes, Prediction Reference Types, and Prediction Parameters", where a prediction partitioning and prediction type may be selected and the associated parameters (e.g., prediction modes, reference types, and parameters) may be saved for encoding in the bitstream. In some examples, the potential prediction partitioning with a minimum prediction error may be selected. In some examples, the potential prediction partitioning may be selected based on a rate distortion optimization (RDO). In some examples, the associated prediction parameters may be stored and encoded in the bitstream as discussed for transmission to and use by a decoder.

Process 1400 may continue at operation 1407, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of potential coding partitionings of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles, or coding units, or super-fragments in some examples) may be partitioned by a k-d tree coding partitioner module. In some examples, a coding partitioner module may be chosen or selected via a switch or switches. For example, the partitions may be generated by coding partitions generator module 107. As discussed, in some examples, it may be determined whether prediction error data partitions or residuals require encoding. For example, if the residual is greater than or equal to a threshold (e.g., a predefined threshold or a heuristically determined threshold or the like), the residual may be deemed as requiring encoding. If the residual is less than the threshold, the residual may be deemed as not requiring encoding. For example, it may be determined that an individual residual requires encoding.

The coding partitionings and various combinations of adaptive and fixed transforms performed on the coding partitionings may be used to determine an optimal or selected coding partitioning and associated transforms based on a rate distortion optimization or the like as is discussed below. In some examples, the generated coding partitions (e.g., based on k-d tree partitioning) may each be indexed with index values 1, 2, 3, . . . , m. For example, the coding partitions may be indexed at coding partitions generator module 107 of encoder 100. The generated coding partitions and the associated coding partition index values may be transmitted to an encode controller 103.

Process 1400 may continue at operation 1408, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein. The selected coding partitioning may be coded via coding partition indicators or coding partition codewords as discussed herein for encoding into the bitstream. Similarly, the chosen transforms may be coded using a codebook or indicators or the like and encoded into the Process 1400 may continue at operation 1409, "Quantize and Scan Transform Coefficients", where transform coefficients associated with coding partitions (and/or transform blocks; e.g., the transform coefficients generated by the selected transforms based on the selected coding partitioning) may be quantized and scanned in preparation for entropy coding.

Process 1400 may continue at operation 1410, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles, coding units, or super-fragments. The assembled tiles, coding units, or super-fragments may be optionally processed via deblock filtering and/or quality restoration filtering and assembled to generate a picture. The picture may be saved in decoded picture buffer 119 as a reference picture (as discussed) for prediction of other (e.g., following) pictures.

Process 1400 may continue at operation 1411, "Entropy Encode Data associated with Each Tile, Coding Unit, or Super-fragment", where data associated with each tile, coding unit, or super-fragment may be entropy encoded. For example, data associated with each tile, coding unit, or super-fragment of each picture of each group of pictures of each video sequence may be entropy encoded. The entropy encoded data may include the data (e.g., inter- or intra-prediction data) associated with the prediction partitions (e.g., prediction coding indicators or codewords), modes data, reference types data, prediction parameters, motion vectors, data defining coding partitions (e.g., coding partition indicators or codewords), block size data for performing selected transforms, transform type data (indicating the selected transforms), a quantizer (Qp; indicating a granularity of quantization), and quantized transform coefficients.

Process 1400 may continue at operation 1412, "Generate Bitstream" where a bitstream may be generated based on the entropy encoded data. As discussed, in some examples, the bitstream may include a frame or picture reference (e.g., data indicating a picture or frame type), the data (e.g., inter- or intra-prediction data) associated with the prediction partitions (e.g., prediction coding indicators or codewords), modes data, reference types data, prediction parameters (e.g., morphing parameters or synthesizing parameters associated with the reference types), motion vectors, data defining coding partitions (e.g., coding partition indicators or codewords), block size data for performing selected transforms, transform type data (indicating the selected transforms), a quantizer (Qp; indicating a granularity of quantization), and quantized transform coefficients associated with a prediction partition.

Process 1400 may continue at operation 1413, "Transmit Bitstream", where the bitstream may be transmitted. For example, video coding system 2000 may transmit output bitstream 111, bitstream 1400, or the like via an antenna 2002 (please refer to FIG. 20).

Operations 1401-1413 may provide for video encoding and bitstream transmission techniques, which may be employed by an encoder system as discussed herein. The following operations, operations 1414-1423 may provide for video decoding and video display techniques, which may be employed by a decoder system as discussed herein.

Process 1400 may continue at operation 1414, "Receive Bitstream", where the bitstream may be received. For example, input bitstream 201, bitstream 1400, or the like may be received via decoder 200. In some examples, the bitstream may include data associated with a coding partition, one or more indicators, data defining coding partition(s), prediction data, and/or data defining prediction partition(s) as discussed above. In some examples, the bitstream may include the data (e.g., inter- or intra-prediction data) associated with the prediction partitions, data defining prediction partitions, and the data associated with an individual prediction error data partition. In some examples, the bitstream may include a frame or picture reference (e.g., data indicating a picture or frame type), the data (e.g., inter- or intra-prediction data) associated with the prediction partitions (e.g., prediction coding indicators or codewords), modes data, reference types data, prediction parameters (e.g., morphing parameters or synthesizing parameters associated with the reference types), motion vectors, data defining coding partitions (e.g., coding partition indicators or codewords), block size data for performing selected transforms, transform type data (indicating the selected transforms), a quantizer (Qp; indicating a granularity of quantization), and quantized transform coefficients associated with a prediction partition, Process 1400 may continue at operation 1415, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), indictors, the data (e.g., inter- or intra-prediction data) associated with the prediction partitions, data defining prediction partitions, and the data associated with an individual prediction error data partition, or the like. In some examples, the bitstream may be decoded to determine a frame or picture reference (e.g., data indicating a picture or frame type), the data (e.g., inter- or intra-prediction data) associated with the prediction partitions (e.g., prediction coding indicators or codewords), modes data, reference types data, prediction parameters (e.g., morphing parameters or synthesizing parameters associated with the reference types), motion vectors, data defining coding partitions (e.g., coding partition indicators or codewords), block size data for performing selected transforms, transform type data (indicating the selected transforms), a quantizer (Qp; indicating a granularity of quantization), and/or quantized transform coefficients associated with a prediction partition.

Process 1400 may continue at operation 1416, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 1400 may continue at operation 1417, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 1400 may continue at operation 1418, "Generate Predicted Partitions (Pixel Data) for Each Prediction Partition", where prediction pixel data (e.g., a predicted partition) may be generated for each prediction partition. For example, prediction pixel data may be generated using the selected prediction mode and reference type (e.g., based on characteristics and motion, or intra-, or other types; and based on various decoded, morphed, and/or synthesized reference pictures as discussed) and associated prediction parameters (e.g., morphing or synthesizing parameters, if needed 0.

Process 1400 may continue at operation 1419, "Add to Each Decoded Prediction Error Partition the Corresponding Predicted Partition to Generate Reconstructed Prediction Partition", where each decoded prediction error partition (e.g., including zero prediction error partitions) may be added to the corresponding predicted partition to generated a reconstructed prediction partition. For example, predicted partitions may be generated via the decode loop illustrated in FIG. 2 and added via adder 206 to decoded prediction error partitions.

Process 1400 may continue at operation 1420, "Assemble Reconstructed Prediction Partitions to Generate Decoded Tiles, Coding Units, or Super-fragments", where reconstructed prediction partitions may be assembled to generate decoded tiles, coding units, or super-fragments. For example, reconstructed partitions may be assembled to generate decoded tiles, coding units, or super-fragments via prediction partitions assembler module 207.

Process 1400 may continue at operation 1421, "Apply Deblock Filtering and/or QR Filtering to Generate Final Decoded Tiles, Coding Units or Super-fragments", where optional deblock filtering and/or quality restoration filtering may be applied to the decoded tiles, coding units, or super-fragments to generate final decoded tiles, coding units, or super-fragments. For example, optional deblock filtering may be applied via deblock filtering module 208 and/or optional quality restoration filtering may be applied via quality restoration filtering module 209.

Process 1400 may continue at operation 1422, "Assemble Decoded Tiles, Coding Units, or Super-fragments to Generate a Decoded Video Picture, and Save in Reference Picture Buffers", where decoded (or final decoded) tiles, coding units, or super-fragments may be assembled to generate a decoded video picture, and the decoded video picture may be saved in reference picture buffers (e.g., decoded picture buffer 210) for use in future prediction.

Process 1400 may continue at operation 1423, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 2005 (as shown in FIG. 20) for presentment.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

Figure 15:
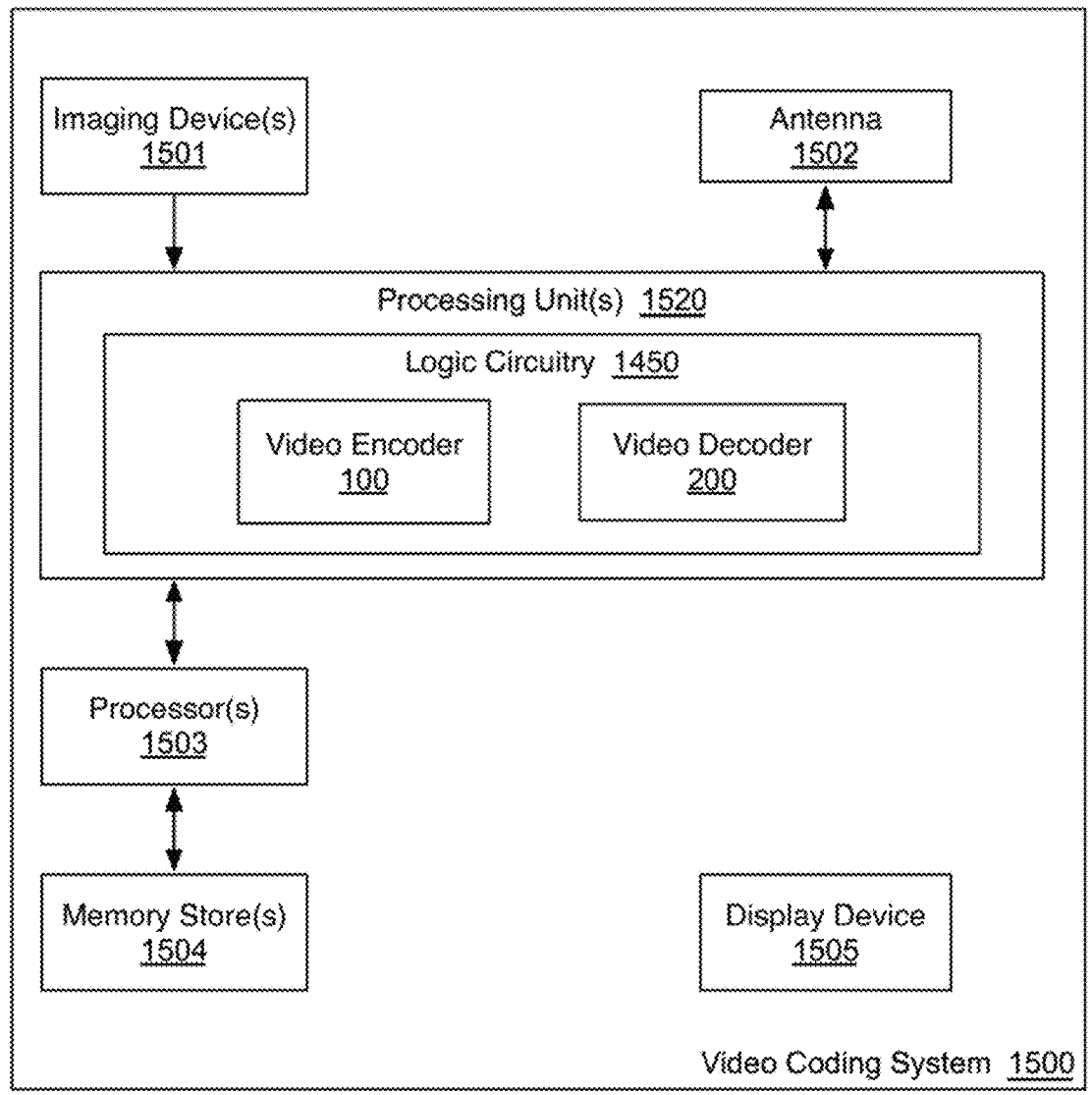
FIG. 15 is an illustrative diagram of an example video coding system.

FIG. 15 is an illustrative diagram of example video coding system 1500, arranged in accordance with at least some implementations of the present disclosure. In the illustrated implementation, video coding system 1500 may include imaging device(s) 1501, video encoder 100 and/or a video encoder implemented via logic circuitry 1450 of processing unit(s) 1520, an antenna 1502, one or more processor(s) 1503, one or more memory store(s) 1504, and/or a display device 1505.

As illustrated, imaging device(s) 1501, antenna 1502, processing unit(s) 1520, logic circuitry 1450, video encoder 100, video decoder 200, processor(s) 1503, memory store(s) 1504, and/or display device 1505 may be capable of communication with one another. As discussed, although illustrated with both video encoder 100 and video decoder 200, video coding system 1500 may include only video encoder 100 or only video decoder 200 in various examples.

As shown, in some examples, video coding system 1500 may include antenna 1502. Antenna 1502 may be configured to transmit or receive an encoded bitstream of video data, for example. Further, in some examples, video coding system 1500 may include display device 1505. Display device 1505 may be configured to present video data. As shown, in some examples, logic circuitry 1450 may be implemented via processing unit(s) 1520. Processing unit(s) 1520 may include application-specific integrated circuit (ASIC) logic, graphics processor(s), general purpose processor(s), or the like. Video coding system 1500 also may include optional processor(s) 1503, which may similarly include application-specific integrated circuit (ASIC) logic, graphics processor(s), general purpose processor(s), or the like. In some examples, logic circuitry 1450 may be implemented via hardware or video coding dedicated hardware or the like, and processor(s) 1503 may implemented general purpose software or operating systems or the like. In addition, memory stores 1504 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1504 may be implemented by cache memory. In some examples, logic circuitry 1450 may access memory stores 1504 (for implementation of an image buffer for example). In other examples, logic circuitry 1450 and/or processing unit(s) 1520 may include memory stores (e.g., cache or the like) for the implementation of an image buffer or the like.

In some examples, video encoder 100 implemented via logic circuitry may include an image buffer (e.g., via either processing unit(s) 1520 or memory store(s) 1504)) and a graphics processing unit (e.g., via processing unit(s) 1520). The graphics processing unit may be communicatively coupled to the image buffer. The graphics processing unit may include video encoder 100 as implemented via logic circuitry 1450 to embody the various modules as discussed with respect to FIG. 1 and FIG. 12. For example, the graphics processing unit may include prediction partitions generator logic circuitry, adaptive picture organizer logic circuitry, inter-prediction logic circuitry, motion compensation generation logic circuitry, differencing logic circuitry, sub-partitions generator logic circuitry, adaptive transform logic circuitry, adaptive entropy encoder logic circuitry, and so on. The logic circuitry may be configured to perform the various operations as discussed herein. For example, the prediction partitions generator logic circuitry may be configured to receive a video frame, segment the video frame into a plurality of tiles, or coding unit, or super-fragments, determine a chosen prediction partitioning technique for at least one tile, coding unit, or super-fragment such that the chosen prediction partitioning technique comprises at least one of a bi-tree partitioning technique or a k-d tree partitioning technique, and partition the at least one tile, coding unit, or super-fragment into a plurality of prediction partitions using the chosen partitioning technique. Video decoder 200 may be implemented in a similar manner.

In some examples, antenna 1502 of video coding system 1500 may be configured to receive an encoded bitstream of video data. Video coding system 1500 may also include video decoder 200 coupled to antenna 1502 and configured to decode the encoded bitstream. For example, video decoder 200 may be configured to entropy decode the encoded bitstream to determine inter-prediction data associated with a first prediction partition, data defining the first prediction partition, intra-prediction data associated with a second prediction partition, and data defining the second prediction partition such that the first prediction partition comprises a bi-tree partition and the second prediction partition comprises a k-d tree partition, perform motion compensation for the first prediction partition based at least in part on the inter-prediction data, perform intra-prediction for the second individual partition based at least in part on the intra-prediction data, generate a first decoded video frame based at least in part on the motion compensation, and transmit the first and second decoded video frames for presentment via a display device.

In embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 16:
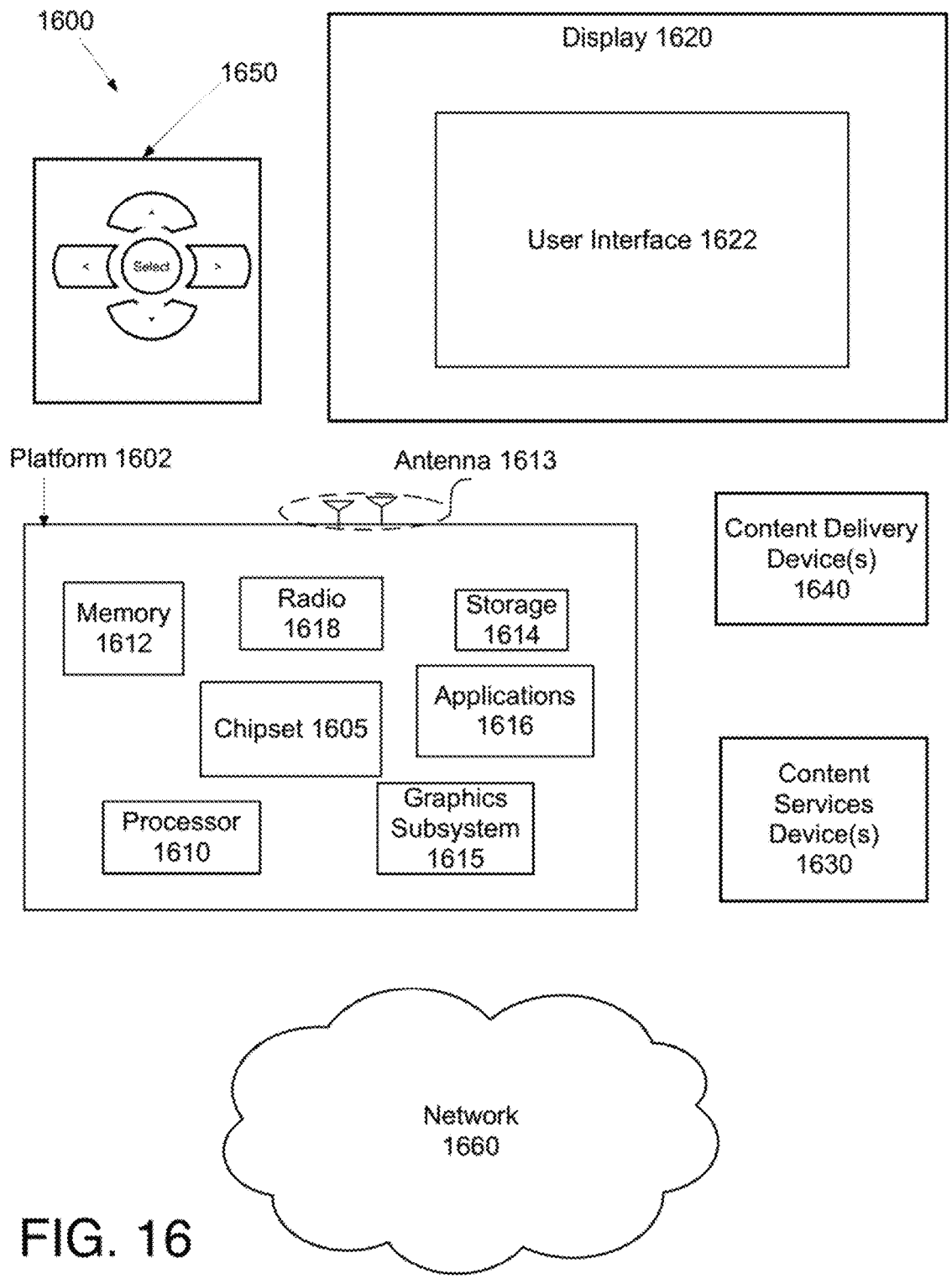
FIG. 16 is an illustrative diagram of an example system.

FIG. 16 is an illustrative diagram of an example system 1600, arranged in accordance with at least some implementations of the present disclosure. In various implementations, system 1600 may be a media system although system 1600 is not limited to this context. For example, system 1600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1600 includes a platform 1602 coupled to a display 1620. Platform 1602 may receive content from a content device such as content services device(s) 1630 or content delivery device(s) 1640 or other similar content sources. A navigation controller 1650 including one or more navigation features may be used to interact with, for example, platform 1602 and/or display 1620. Each of these components is described in greater detail below.

In various implementations, platform 1602 may include any combination of a chipset 1605, processor 1610, memory 1612, antenna 1613, storage 1614, graphics subsystem 1615, applications 1616 and/or radio 1618. Chipset 1605 may provide intercommunication among processor 1610, memory 1612, storage 1614, graphics subsystem 1615, applications 1616 and/or radio 1618. For example, chipset 1605 may include a storage adapter (not depicted) capable of providing intercommunication with storage 1614.

Processor 1610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1610 may be dual-core processor(s), dual-core mobile processor(s), and so forth.

Memory 1612 may be implemented as a volatile memory device such as, but not limited to, a Random Access Memory (RAM), Dynamic Random Access Memory (DRAM), or Static RAM (SRAM).

Storage 1614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1614 may include technology to increase the storage performance enhanced protection for valuable digital media when multiple hard drives are included, for example.

Graphics subsystem 1615 may perform processing of images such as still or video for display. Graphics subsystem 1615 may be a graphics processing unit (GPU) or a visual processing unit (VPU), for example. An analog or digital interface may be used to communicatively couple graphics subsystem 1615 and display 1620. For example, the interface may be any of a High-Definition Multimedia Interface, DisplayPort, wireless HDMI, and/or wireless HD compliant techniques. Graphics subsystem 1615 may be integrated into processor 1610 or chipset 1605. In some implementations, graphics subsystem 1615 may be a stand-alone device communicatively coupled to chipset 1605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1618 may operate in accordance with one or more applicable standards in any version.

In various implementations, display 1620 may include any television type monitor or display. Display 1620 may include, for example, a computer display screen, touch screen display, video monitor, television-like device, and/or a television. Display 1620 may be digital and/or analog. In various implementations, display 1620 may be a holographic display. Also, display 1620 may be a transparent surface that may receive a visual projection. Such projections may convey various forms of information, images, and/or objects. For example, such projections may be a visual overlay for a mobile augmented reality (MAR) application. Under the control of one or more software applications 1616, platform 1602 may display user interface 1622 on display 1620.

In various implementations, content services device(s) 1630 may be hosted by any national, international and/or independent service and thus accessible to platform 1602 via the Internet, for example. Content services device(s) 1630 may be coupled to platform 1602 and/or to display 1620. Platform 1602 and/or content services device(s) 1630 may be coupled to a network 1660 to communicate (e.g., send and/or receive) media information to and from network 1660. Content delivery device(s) 1640 also may be coupled to platform 1602 and/or to display 1620.

In various implementations, content services device(s) 1630 may include a cable television box, personal computer, network, telephone, Internet enabled devices or appliance capable of delivering digital information and/or content, and any other similar device capable of unidirectionally or bidirectionally communicating content between content providers and platform 1602 and/display 1620, via network 1660 or directly. It will be appreciated that the content may be communicated unidirectionally and/or bidirectionally to and from any one of the components in system 1600 and a content provider via network 1660. Examples of content may include any media information including, for example, video, music, medical and gaming information, and so forth.

Content services device(s) 1630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1602 may receive control signals from navigation controller 1650 having one or more navigation features. The navigation features of controller 1650 may be used to interact with user interface 1622, for example. In various embodiments, navigation controller 1650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1650 may be replicated on a display (e.g., display 1620) by movements of a pointer, cursor, focus ring, or other visual indicators displayed on the display. For example, under the control of software applications 1616, the navigation features located on navigation controller 1650 may be mapped to virtual navigation features displayed on user interface 1622, for example. In various embodiments, controller 1650 may not be a separate component but may be integrated into platform 1602 and/or display 1620. The present disclosure, however, is not limited to the elements or in the context shown or described herein.

In various implementations, drivers (not shown) may include technology to enable users to instantly turn on and off platform 1602 like a television with the touch of a button after initial boot-up, when enabled, for example. Program logic may allow platform 1602 to stream content to media adaptors or other content services device(s) 1630 or content delivery device(s) 1640 even when the platform is turned "off." In addition, chipset 1605 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1600 may be integrated. For example, platform 1602 and content services device(s) 1630 may be integrated, or platform 1602 and content delivery device(s) 1640 may be integrated, or platform 1602, content services device(s) 1630, and content delivery device(s) 1640 may be integrated, for example. In various embodiments, platform 1602 and display 1620 may be an integrated unit. Display 1620 and content service device(s) 1630 may be integrated, or display 1620 and content delivery device(s) 1640 may be integrated, for example. These examples are not meant to limit the present disclosure.

In various embodiments, system 1600 may be implemented as a wireless system, a wired system, or a combination of both. When implemented as a wireless system, system 1600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 16.

Figure 17:
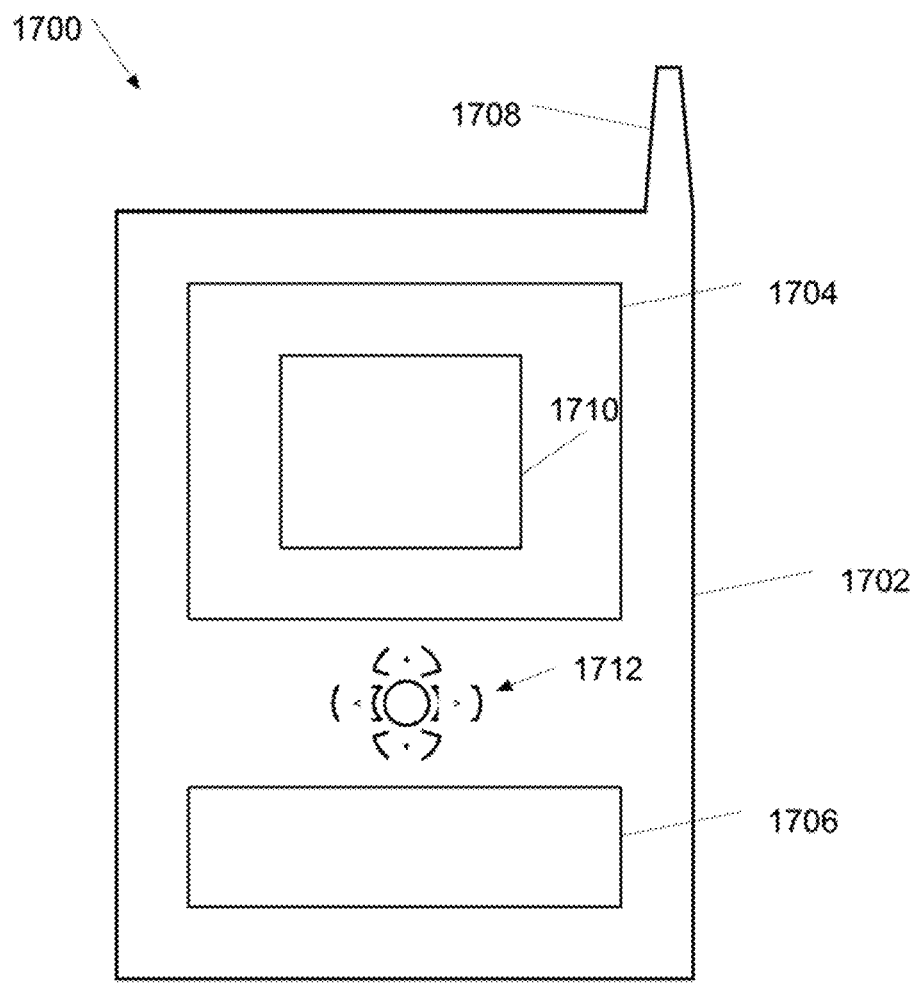
FIG. 17 illustrates an example device.

As described above, system 1600 may be embodied in varying physical styles or form factors. FIG. 17 illustrates implementations of a small form factor device 1700 in which system 1700 may be embodied. In various embodiments, for example, device 1700 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 17, device 1700 may include a housing 1702, a display 1704, an input/output (I/O) device 1706 which may include user interface 1710, and an antenna 1708. Device 1700 also may include navigation features 1712. Display 1704 may include any suitable display unit for displaying information appropriate for a mobile computing device. I/O device 1706 may include any suitable I/O device for entering information into a mobile computing device. Examples for I/O device 1706 may include an alphanumeric keyboard, a numeric keypad, a touch pad, input keys, buttons, switches, rocker switches, microphones, speakers, voice recognition device and software, and so forth. Information also may be entered into device 1700 by way of microphone (not shown). Such information may be digitized by a voice recognition device (not shown). The embodiments are not limited in this context.

Figure 18A:
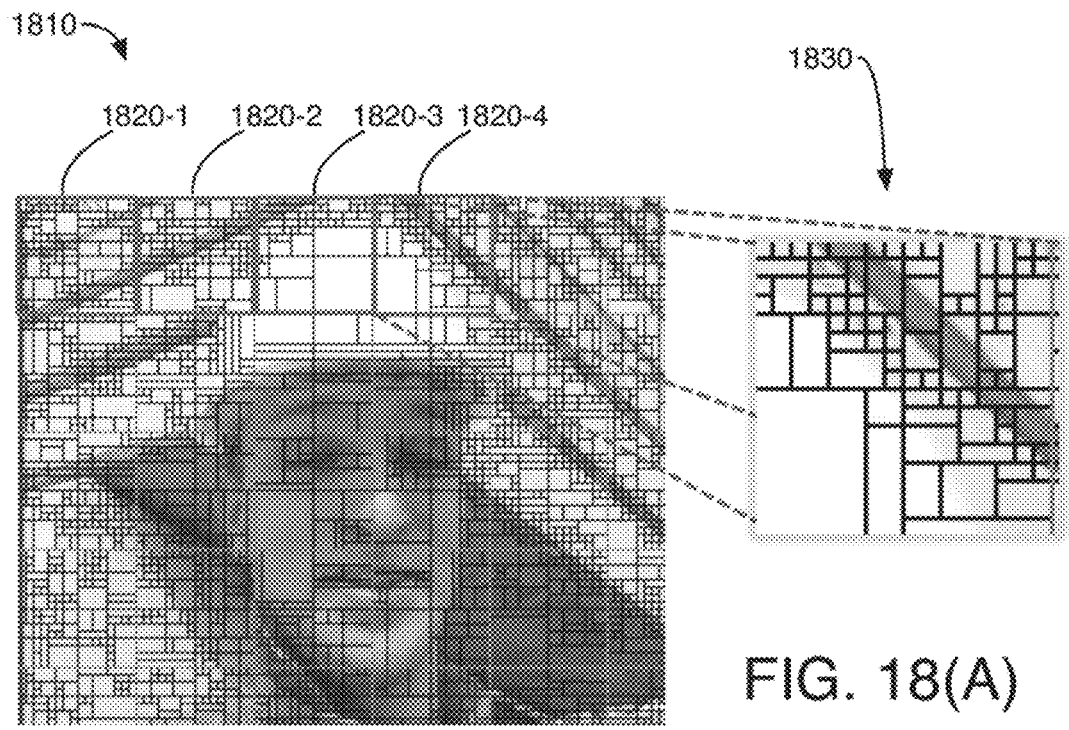
FIGS. 18(A), 18(B), and 18(C) illustrate example prediction partitions and coding partitions for a video frame, all arranged in accordance with at least some implementations of the present disclosure.
Figure 18B:
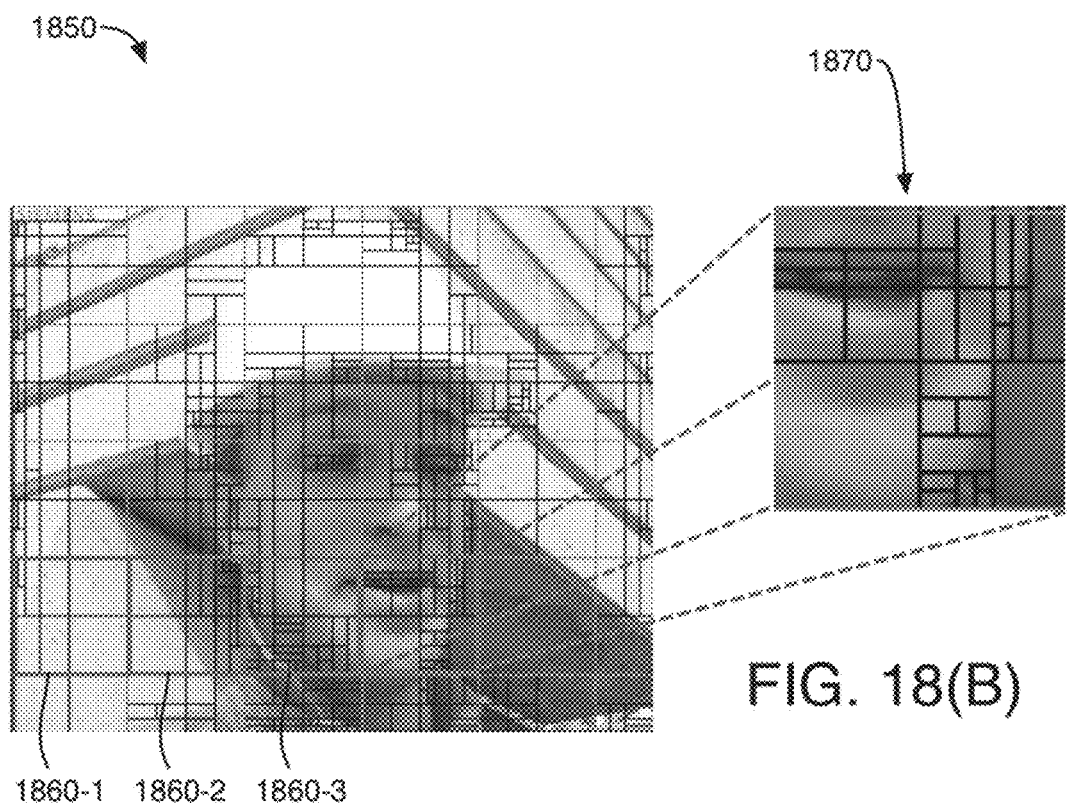
Figure 18C:
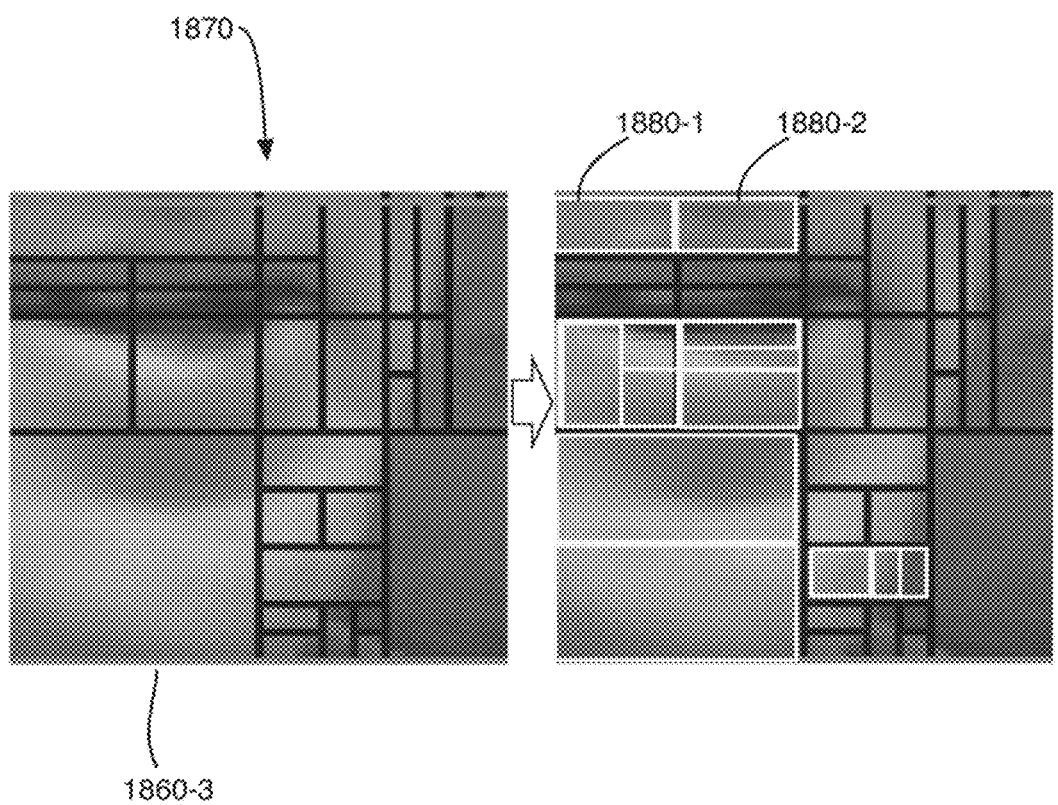

FIGS. 18(A), 18(B), and 18(C) illustrate example prediction partitions and coding partitions for a video frame, arranged in accordance with at least some implementations of the present disclosure. As discussed herein, a video frame may be partitioned into prediction partitions (e.g., using k-d tree or bi-tree partitioning) and further partitioned (in some examples) into coding partitions (e.g., using bi-tree partitioning). For example, FIG. 18(A) illustrates an example video frame 1810. Video frame 1810 may be any video frame as discussed herein. In the example of FIG. 18(A), video frame 1810 may be an I-picture and subjected to k-d tree prediction partitioning. For example, video frame 1810 may be divided or segmented into tiles 1820-1, 1820-2, 1820-3, 1820-4, and so on (other tiles are not labeled for the sake of clarity). As discussed, in other examples, video frame 1810 may be segmented into coding units or super-fragments or the like.

In any event, video frame 1810 (or the tiles, super-fragments, or coding units thereof) may be partitioned into prediction partitions 1830 (which are not each labeled for the sake of clarity). For example, as shown, prediction partitions 1830 may be k-d tree partitions for an I-picture video frame 1850. As discussed, prediction partitions 1830 may be an example partitioning of video frame 1810. Video frame 1810 may be partitioned into any number of partitionings, which may be evaluated for example, for a best or most efficient partitioning, which may be coded via partition indicators or codewords or the like. The prediction partitions of the best partitioning may be used as a structure (or "cuts") for coding as discussed herein (e.g., the generation of predicted partitions of pixel data, prediction error data partitions (e.g., error signal), and further partitioning for coding (e.g., coding partitions).

FIG. 18(B) illustrates an example video frame 1850. Video frame 1850 may be any video frame as discussed herein. In the example of FIG. 18(A), video frame 1850 may be a P-picture or a B/F-picture and subjected to bi-tree prediction partitioning. For example, video frame 1850 may be divided or segmented into tiles 1860-1, 1860-2, 1860-3, and so on (other tiles are not labeled for the sake of clarity). As discussed, in other examples, video frame 1850 may be segmented into coding units or super-fragments or the like. Video frame 1850 (or the tiles, super-fragments, or coding units thereof) may be partitioned into prediction partitions 1870 (which are not each labeled for the sake of clarity). For example, as shown, prediction partitions 1870 may be bi-tree partitions for a P-picture or a B/F-picture video frame 1850. As discussed, prediction partitions 1870 may be an example partitioning of video frame 1850. Video frame 1850 may be partitioned into any number of partitionings, which may be evaluated for example, for a best or most efficient partitioning, which may be coded via partition indicators or codewords or the like as discussed.

FIG. 18(C) illustrates an example tile 1860-3 of example video frame 1850. As shown tile 1860-3 may be partitioned into prediction partitions 1870 (illustrated with black lines). As discussed prediction partitions 1870 may be used for coding such that predicted partitions may be generated associated with prediction partitions 1870 and prediction error data partitions may be generated (e.g., the predicted partitions may be differenced with original pixel data to generate the prediction error data partitions), which are also associated with prediction partitions 1870. A determination may be made as to whether the prediction error data partitions need to be encoded and, if so, the prediction error data partitions may be further partitioned into coding partitions (for transform coding, quantization of transform coefficients, and incorporation of the quantized transform coefficients into a bitstream). As discussed, such partitioning into coding partitions may be performed via a bi-tree partitioning technique. For example, example coding partitions 1880-1, 1880-2, and so on (illustrated with white lines; not each coding partition is labeled for the sake of clarity) may be generated based on prediction partitions 1870 (and the prediction error data partitions associated with prediction partitions 1870).

As discussed coding partitions 1880-1, 1880-2, and so on may represent an example coding partitioning. In some examples, several coding partitionings (and many combinations of transform types) may be evaluated to determine a best or most efficient coding partitioning (and associated transform types and sizes). The coding partitions associated with the selected coding partitioning may be coded via coding partition indicators or codewords or the like and encoded via a bitstream. Further, the coding partitions may be used to transform code the coding partitions of prediction error data partitions to generate transform coefficients, which may be quantized and entropy encoded into the bitstream for use at a decoder, for examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for partitioning in video coding may include receiving a video frame, segmenting the video frame into a plurality of tiles, coding units, or super-fragments, determining a chosen prediction partitioning technique for at least one tile, coding unit, or super-fragment for prediction or coding partitioning such that the chosen prediction partitioning technique may include at least one of a bi-tree partitioning technique, a k-d tree partitioning technique, a codebook representation of a bi-tree partitioning technique, or a codebook representation of a k-d tree partitioning technique, partitioning the at least one tile, coding unit, or super-fragment into a plurality of prediction partitions using the chosen partitioning technique, and coding partitioning indicators or codewords associated with the plurality of prediction partitions into a bitstream.

In another example, a computer-implemented method for partitioning in video coding may further include segmenting the video frame into two or more region layers such that the two or more region layers comprise a precision of at least one of 4 pixels, 8 pixels, or 16 pixels, such that the two or more region layers comprise region boundaries, such that segmenting the video frame into the plurality of tiles, coding units, or super-fragments may include segmenting the video frame into the plurality of super-fragments, such that segmenting the video frame may include symbol-run coding using 16×16 pixel blocks, and such that the at least one super-fragment may include an individual region layer of the two or more region layers, coding the region boundaries, such that coding the region boundaries may include at least one of symbol-run coding or generating a codebook that approximates the region boundaries on a tile grid, such that the tile grid may include an equally spaced tile grid having a size of at least one of 32×32 pixels or 64×64 pixels, indexing the plurality of prediction partitions with prediction partition index values, transmitting the plurality of prediction partitions and partition prediction index values to an encode controller, generating inter-prediction data associated with a first individual prediction partition of the plurality of prediction partitions such that the inter-prediction data may include motion vector data, generating intra-prediction data associated with a second individual prediction partition of a second plurality of prediction partitions of a second tile, coding unit, or super-fragment of a second video frame, differencing a plurality of predicted partitions associated with the plurality of prediction partitions with corresponding original pixel data to generate a corresponding plurality of prediction error data partitions such that a first predicted partition of the plurality of predicted partitions is predicted based at least in part on a reference frame including an immediately previous reference frame, an earlier previous reference frame, a future reference frame, a morphed reference frame, or a synthesized reference frame, generating a reference type indicator for the first predicted partition based on the reference frame, generating a prediction mode indicator based on a prediction mode of the first predicted partition, wherein the prediction mode is selected from at least one of inter, multi, intra, skip, auto, or split, encoding the reference type indicator and the prediction mode into the bitstream, determining an individual prediction error data partition of the plurality of prediction error data partitions is required to be encoded, for the individual prediction error data partition that is required to be encoded: partitioning the prediction error data partition into a plurality of coding partitions such that partitioning the prediction error data partition comprises a bi-tree partitioning, indexing the plurality of coding partitions with coding partition index values, transmitting the coding partitions and the coding partition index values to the encode controller, and performing a forward transform and quantization on the coding partitions of the individual prediction error data partition to generate data associated with the individual prediction error data partition, entropy encoding the inter-prediction data associated with the first individual prediction partition, data defining the first individual prediction partition, the intra-prediction data associated with the second individual prediction partition, data defining the second individual prediction partition, and the data associated with the individual prediction error data partition into a bitstream, transmitting the bitstream, receiving the bitstream, entropy decoding the bitstream to determine the inter-prediction data associated with the first individual prediction partition, the data defining the first individual prediction partition, the intra-prediction data associated with the second individual prediction partition, the data defining the second individual prediction partition, and the data associated with the individual prediction error data partition such that the first individual prediction partition comprises a bi-tree partition and the second individual prediction partition comprises a k-d tree partition, performing an inverse quantization and an inverse transform based at least in part on the data associated with the individual prediction error data partition to generate decoded coding partitions, combining the decoded coding partitions to generate a decoded prediction error data partition, adding a first individual decoded predicted partition to the decoded prediction error data partition to generate a first reconstructed partition, assembling the first reconstructed partition and a second reconstructed partition to generate at least one of a first tile, a first coding unit or a first super-fragment, applying at least one of a deblock filtering or a quality restoration filtering to the first tile, coding unit, or the first super-fragment to generate a first final decoded tile, coding unit, or super-fragment, assembling the first final decoded tile, coding unit or super-fragment with a second final decoded tile, coding unit, or super-fragment to generate a first decoded video frame, performing motion compensation to generate a second decoded individual prediction partition based at least in part on the inter-prediction data, performing intra-prediction for a third decoded individual prediction partition of the second plurality of partitions based at least in part on the intra-prediction data, generating a second decoded video frame based at least in part on the motion compensation, generating a third decoded video frame based at least in part on the intra-prediction, and transmitting the first, second, and third decoded video frames for presentment via a display device. The segmenting the video frame into the plurality of tiles, or coding unit, or super-fragments may include segmenting the video frame into the plurality of tiles. Determining the chosen partitioning technique may include determining the chosen partitioning technique based at least in part on a picture type of the video frame. The picture type may include at least one of an I-picture (intra-picture), a P-picture (predictive-picture), or an F/B-picture (functional/bi-directional picture). The picture type may include the I-picture, and the chosen prediction partitioning technique may include the k-d tree partitioning technique. The picture type may include the P-picture and the chosen prediction partitioning technique may include the bi-tree partitioning technique. The picture type may include the F/B-picture, and the chosen prediction partitioning technique may include the bi-tree partitioning technique. Determining the chosen partitioning technique may include determining the chosen partitioning technique based at least in part on a characteristic of the at least one tile, coding unit, or super-fragment such that the characteristic comprises an expected amount of intra-blocks in the at least one tile, coding unit, or super-fragment and such that the chosen partitioning technique may include the k-d tree partitioning technique when the expected amount of intra-blocks is greater than a threshold, and such that the chosen partitioning technique may include the bi-tree partitioning technique when the expected amount of intra-blocks is less than a threshold. Partitioning the at least one tile, coding unit, or super-fragment may include a partitioning constraint such that the partitioning constraint may include pre-defining a first partition as halving the at least one frame portion in a first dimension and pre-defining a second partition as halving the at least one frame portion in a second dimension, and such that the first dimension may include a vertical dimension and the second dimension may include a horizontal dimension.

In other examples, a video encoder may include an image buffer and a graphics processing unit having prediction partitions generator logic circuitry. The graphics processing unit may be communicatively coupled to the image buffer and the prediction partitions generator logic circuitry may be configured to receive a video frame, segment the video frame into a plurality of tiles, coding units, or super-fragments, determine a chosen prediction partitioning technique for at least one tile, coding unit, or super-fragment such that the chosen prediction partitioning technique may include at least one of a bi-tree partitioning technique or a k-d tree partitioning technique, and partition the at least one tile, coding unit, or super-fragment into a plurality of prediction partitions using the chosen partitioning technique.

In a further example video encoder, the graphics processing unit may include inter-prediction logic circuitry configured to generate inter-prediction data associated with a first individual prediction partition of the plurality of prediction partitions such that the inter-prediction data comprises motion vector data, intra-prediction logic circuitry configured to generate intra-prediction data associated with a second individual prediction partition of a second plurality of prediction partitions of a second tile, coding unit, or super-fragment of a second video frame, differencing logic circuitry configured to difference a plurality of predicted partitions associated with the plurality of prediction partitions with corresponding original pixel data to generate a corresponding plurality of prediction error data partitions such that a first predicted partition of the plurality of predicted partitions is predicted based at least in part on a reference frame comprising an immediately previous reference frame, an earlier previous reference frame, a future reference frame, a morphed reference frame, or a synthesized reference frame, coding partitions generator logic circuitry configured to determine an individual prediction error data partition of the plurality of prediction error data partitions is required to be encoded and, for the individual residual that is required to be encoded, partition the prediction error data partition into a plurality of coding partitions such that partitioning the prediction error data partition comprises a bi-tree partitioning, index the plurality of coding partitions with coding partition index values, and transmit the coding partitions and the coding partition index values to the encode controller, adaptive transform logic circuitry and adaptive quantize logic circuitry configured to perform a forward transform and quantization on the coding partitions of the individual prediction error data partition to generate data associated with the individual prediction error data partition, and adaptive entropy encoder logic circuitry configured to entropy encode the inter-prediction data associated with the first individual prediction partition, data defining the first individual prediction partition, the intra-prediction data associated with the second individual prediction partition, data defining the second individual prediction partition, and the data associated with the individual prediction error data partition into a bitstream and transmit the bitstream. The prediction partitions generator logic circuitry may be further configured to segment the video frame into two or more region layers such that the two or more region layers may include a precision of at least one of 4 pixels, 8 pixels, or 16 pixels such that the two or more region layers may include region boundaries, such that to segment the video frame into the plurality of tiles, coding units, or super-fragments may include the prediction partitions generator logic circuitry being further configured to segment the video frame into the plurality of super-fragments, such that to segment the video frame into the plurality of tiles, or coding unit, or super-fragments may include the prediction partitions generator logic circuitry being further configured to segment the video frame by symbol-run coding using 16×16 pixel blocks, and such that the at least one super-fragment may include an individual region layer of the two or more region layers, code the region boundaries such that coding the region boundaries may include at least one of symbol-run coding or generating a codebook that approximates the region boundaries on a tile grid such that the tile grid may be an equally spaced tile grid having a size of at least one of 32×32 pixels or 64×64 pixels, index the plurality of prediction partitions with prediction partition index values, and transmit the plurality of prediction partitions and partition prediction index values to an encode controller. To segment the video frame into the plurality of tiles, coding units, or super-fragments may include the prediction partitions generator logic circuitry being configured to segment the video frame into the plurality of tiles. To determine the chosen partitioning technique may include the prediction partitions generator logic circuitry being configured to determine the chosen partitioning technique based at least in part on a picture type of the video frame. The picture type may include at least one of an I-picture (intra-picture), a P-picture (predictive-picture), or an F/B-picture (functional/bi-directional picture). The picture type may include the I-picture and the chosen prediction partitioning technique may include the k-d tree partitioning technique. The picture type may include the P-picture and the chosen prediction partitioning technique may include the bi-tree partitioning technique. The picture type may include the F/B-picture and the chosen prediction partitioning technique may include the bi-tree partitioning technique. To determine the chosen partitioning technique may include the prediction partitions generator logic circuitry being configured to determine the chosen partitioning technique based at least in part on a characteristic of the at least one tile, coding unit, or super-fragment such that the characteristic may include an expected amount of intra-blocks in the at least one tile, coding unit, or super-fragment and such that the chosen partitioning technique may include the k-d tree partitioning technique when the expected amount of intra-blocks is greater than a threshold, and such that the chosen partitioning technique comprises the bi-tree partitioning technique when the expected amount of intra-blocks is less than a threshold. To partition the at least one tile, coding unit, or super-fragment may include the prediction partitions generator logic circuitry being configured to apply a partitioning constraint such that the partitioning constraint may include pre-defining a first partition as halving the at least one frame portion in a first dimension and pre-defining a second partition as halving the at least one frame portion in a second dimension, and such that the first dimension may include a vertical dimension and the second dimension comprises a horizontal dimension.

In yet another example, a system may include a video decoder configured to decode an encoded bitstream. The video decoder may be configured to entropy decode the encoded bitstream to determine inter-prediction data associated with a first prediction partition, data defining the first prediction partition, intra-prediction data associated with a second prediction partition, and data defining the second prediction partition such that the first prediction partition may include a bi-tree partition and the second prediction partition comprises a k-d tree partition, perform motion compensation for the first prediction partition based at least in part on the inter-prediction data, perform intra-prediction for the second individual partition based at least in part on the intra-prediction data, generate a first decoded video frame based at least in part on the motion compensation, generate a second decoded video frame based at least in part on the intra-prediction, and transmit the first and second decoded video frames for presentment via a display device.

In a further example system, the system may also include an antenna communicatively coupled to the video decoder and configured to receive the encoded bitstream of video data and a display device configured to present video frames. The video decoder may be further configured to entropy decode the bitstream to determine data associated with an individual prediction error data partition such that the individual prediction error data partition comprises bi-tree coding partitions, perform an inverse quantization and an inverse transform based at least in part on the data associated with the individual prediction error data partition to generate decoded coding partitions, combine the decoded coding partitions to generate a decoded prediction error data partition, add a prediction partition to the decoded prediction error data partition to generate a first reconstructed partition, assemble the first reconstructed partition and a second reconstructed partition to generate at least one of a first tile, coding unit, or a first super-fragment, apply at least one of a deblock filtering or a quality restoration filtering to the first tile, coding unit, or the first super-fragment to generate a first final decoded tile, coding unit, or super-fragment, assemble the first final decoded tile, coding unit, or super-fragment with a second final decoded tile, coding unit, or super-fragment to generate a third decoded video frame, and transmit the third decoded video frame for presentment via the display device. The first video frame may include a picture type comprising at least one of a P-picture or an F/B-picture. The second video frame may include a picture type comprising an I-picture. The third video frame may include a picture type comprising at least one of a P-picture or an FB-picture.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for partitioning in video coding, comprising:
    receiving a video frame;
    segmenting the video frame into a plurality of tiles, coding units or super-fragments;
    determining a chosen partitioning technique for at least one tile, coding unit, or super-fragment for prediction or coding partitioning, comprising:
        choosing the partitioning technique depending, at least in part, on the picture type of the video frame so that an I-picture is partitioned by using a k-d tree partitioning technique, and a P-picture is partitioned by using a bi-tree partitioning technique;
    wherein the chosen partitioning technique comprises a structured partitioning technique comprising at least one of the bi-tree partitioning technique, the k-d tree partitioning technique, a codebook representation of the bi-tree partitioning technique, or a codebook representation of the k-d tree partitioning technique;
    partitioning the at least one tile, coding unit, or super-fragment into a plurality of prediction partitions using the chosen partitioning technique; and
    coding partitioning indicators defining the location and direction of the cuts forming the partitions, and indicated by at least one symbol from a codebook and for individual partitions of the plurality of prediction partitions into a bitstream.

2. The method of claim 1, further comprising:
    segmenting the video frame into two or more region layers, wherein segmenting the video frame into the plurality of tiles, coding units, or super-fragments comprises segmenting the video frame into the plurality of super-fragments, and wherein the at least one super-fragment comprises an individual region layer of the two or more region layers.

3. The method of claim 1, wherein segmenting the video frame into the plurality of tiles, coding units, or super-fragments comprises segmenting the video frame into the plurality of tiles.

4. The method of claim 1, further comprising:
    differencing a plurality of predicted partitions associated with the plurality of prediction partitions with corresponding original pixel data to generate a corresponding plurality of prediction error data partitions;
    determining an individual prediction error data partition of the plurality of prediction error data partitions is required to be encoded; and
    for the individual prediction error data partition that is required to be encoded:
        partitioning the prediction error data partition into a plurality of coding partitions, wherein partitioning the prediction error data partition comprises a bi-tree partitioning.

5. The method of claim 1, further comprising:
    generating inter-prediction data associated with a first individual prediction partition of the plurality of prediction partitions;
    generating intra-prediction data associated with a second individual prediction partition of a second plurality of prediction partitions of a second tile, coding unit, or super-fragment of a second video frame;

differencing the plurality of prediction partitions with corresponding original pixel data to generate a corresponding plurality of prediction error data partitions;

determining an individual prediction error data partition of the plurality of prediction error data partitions is required to be encoded;

for the individual prediction error data partition that is required to be encoded:
partitioning the prediction error data partition into a plurality of coding partitions, wherein partitioning the prediction error data partition comprises a bi-tree partitioning;
indexing the plurality of coding partitions with coding partition index values that are each one of the at least one symbol for an individual partition;
transmitting the coding partitions and the coding partition index values to the encode controller; and
performing a forward transform and quantization on the coding partitions of the individual prediction error data partition to generate data associated with the individual prediction error data partition; and entropy encoding the inter-prediction data associated with the first individual prediction partition, data defining the first individual prediction partition, the intra-prediction data associated with the second individual prediction partition, data defining the second individual prediction partition, and the data associated with the individual prediction error data partition into a bitstream.

6. The method of claim 1, wherein determining the chosen partitioning technique comprises determining the chosen partitioning technique based at least in part on a picture type of the video frame, wherein the picture type comprises the FB-picture, and wherein the chosen prediction partitioning technique comprises the bi-tree partitioning technique.

7. The method of claim 1, wherein determining the chosen partitioning technique comprises determining the chosen partitioning technique based at least in part on a characteristic of the at least one tile, coding unit, or super-fragment, wherein the characteristic comprises an expected amount of intra-blocks in the at least one tile, coding unit, or super-fragment and wherein the chosen partitioning technique comprises the k-d tree partitioning technique when the expected amount of intra-blocks is greater than a threshold, and wherein the chosen partitioning technique comprises the bi-tree partitioning technique when the expected amount of intra-blocks is less than a threshold.

8. The method of claim 1, wherein partitioning the at least one tile, coding unit, or super-fragment comprises a partitioning constraint.

9. A video encoder comprising:
an image buffer; and
a graphics processing unit comprising prediction partitions generator logic circuitry, wherein the graphics processing unit is communicatively coupled to the image buffer and wherein the prediction partitions generator logic circuitry is configured to:
receive a video frame;
segment the video frame into a plurality of tiles, coding units, or super-fragments;
determine a chosen prediction partitioning technique for at least one tile, coding unit, or super-fragment, comprising:
choosing the partitioning technique depending, at least in part, on the expected amount of intra-blocks in the video frame so that a k-d tree partitioning technique is chosen when the expected amount of intra-blocks is greater than a threshold, and a bi-tree partitioning technique is chosen when the expected amount of intra-blocks is less than a threshold
wherein the chosen partitioning technique comprises a structured partitioning technique comprising at least one of a codebook representation of the bi-tree partitioning technique, or a codebook representation of the k-d tree partitioning technique, wherein each codebook defines the location and direction of the cuts forming the partitions, and indicated by at least one symbol for individual partitions; and
partition the at least one tile, coding unit, or super-fragment into a plurality of prediction partitions using the chosen partitioning technique.

10. The video encoder of claim 9, wherein the prediction partitions generator logic circuitry is further configured to:
segment the video frame into two or more region layers, wherein to segment the video frame into the plurality of tiles, coding units, or super-fragments comprises the prediction partitions generator logic circuitry being configured to the video frame into the plurality of super-fragments, and wherein the at least one super-fragment comprises an individual region layer of the two or more region layers.

11. The video encoder of claim 9, wherein to segment the video frame into the plurality of tiles, coding units, or super-fragments comprises the prediction partitions generator logic circuitry being configured to segment the video frame into the plurality of tiles.

12. The video encoder of claim 9, the graphics processing unit further comprising:
differencing logic circuitry configured to:
difference a plurality of predicted partitions associated with the plurality of prediction partitions with corresponding original pixel data to generate a corresponding plurality of prediction error data partitions;
coding partitions generator logic circuitry configured to:
determine an individual prediction error data partition of the plurality of prediction error data partitions is required to be encoded; and
for the individual residual that is required to be encoded:
partition the prediction error data partition into a plurality of coding partitions, wherein partitioning the prediction error data partition comprises a bi-tree partitioning.

13. The video encoder of claim 9, wherein to determine the chosen partitioning technique comprises the prediction partitions generator logic circuitry being configured to determine the chosen partitioning technique based at least in part on a picture type of the video frame.

14. The video encoder of claim 9, wherein to determine the chosen partitioning technique comprises the prediction partitions generator logic circuitry being configured to determine the chosen partitioning technique based at least in part on a characteristic of the at least one tile, coding unit, or super-fragment that is different than a characteristic of another of the same type of partition of a tile, coding unit or super-fragment and on the same frame.

15. A decoder system comprising:
a video decoder configured to decode an encoded bitstream, wherein the video decoder is configured to:
entropy decode the encoded bitstream to determine inter-prediction data associated with a first prediction partition, data defining the first prediction partition, intra-prediction data associated with a second prediction partition, and data defining the second prediction partition, wherein the first prediction partition comprises a bi-tree partition and the second prediction partition comprises a k-d tree partition prediction or coding partitioning, wherein the partitioning technique was chosen depending, at least in part, on the picture type of the video frame so that an I-picture is partitioned by using a k-d tree partitioning technique, and a P-picture is partitioned by using a bi-tree partitioning technique;

perform motion compensation for the first prediction partition based at least in part on the inter-prediction data;

perform intra-prediction for the second individual partition based at least in part on the intra-prediction data;

generate a first decoded video frame based at least in part on the motion compensation;

generate a second decoded video frame in the same video sequence as the first video frame and based at least in part on the intra-prediction; and transmit the first and second decoded video frames for presentment via a display device.

16. The decoder system of claim 15, wherein the video decoder is further configured to:

entropy decode the bitstream to determine data associated with an individual prediction error data partition, wherein the individual prediction error data partition comprises bi-tree coding partitions;

perform an inverse quantization and an inverse transform based at least in part on the data associated with the individual prediction error data partition to generate decoded coding partitions;

combine the decoded coding partitions to generate a decoded prediction error data partition;

add a prediction partition to the decoded prediction error data partition to generate a first reconstructed partition;

assemble the first reconstructed partition and a second reconstructed partition to generate at least one of a first tile, coding unit, or a first super-fragment;

apply at least one of a deblock filtering or a quality restoration filtering to the first tile, coding unit, or the first super-fragment to generate a first final decoded tile, coding unit, or super-fragment;

assemble the first final decoded tile, coding unit, or super-fragment with a second final decoded tile, coding unit, or super-fragment to generate a third decoded video frame; and transmit the third decoded video frame for presentment via the display device.

17. The decoder system of claim 15, wherein the first video frame comprises a picture type comprising FB-picture.

18. The decoder system of claim 15, further comprising:

an antenna communicatively coupled to the video decoder and configured to receive the encoded bitstream of video data; and a display device configured to present video frames.

19. At least one non-transitory machine readable medium comprising a plurality of instructions that in response to being executed on a computing device, cause the computing device to provide video coding by:

determining a chosen partitioning technique comprising determining the chosen partitioning technique based at least in part on a characteristic of the at least one tile, coding unit, or super-fragment, wherein the characteristic comprises an expected amount of intra-blocks in the at least one tile, coding unit, or super-fragment, wherein the chosen partitioning technique comprises the k-d tree partitioning technique when the expected amount of intra-blocks is greater than a threshold, and wherein the chosen partitioning technique comprises the bi-tree partitioning technique when the expected amount of intra-blocks is less than a threshold; receiving a prediction error data partition for transform coding; partitioning the prediction error data partition to generate a plurality of coding partitions of the prediction error data partition; performing a content adaptive transform on a first subset of the plurality of coding partitions comprising performing a parametric transform to allow locally optimal transform coding; and performing a fixed transform on a second subset of the plurality of coding partitions comprising performing more globally stable and lower overhead transform coding than the content adaptive transform; wherein the content adaptive or fixed transform is applied depending on partition size.

20. The machine readable medium of claim 19, further comprising instructions that in response to being executed on a computing device, cause the computing device to provide video coding by:

segmenting the video frame into two or more region layers, wherein segmenting the video frame into the plurality of tiles, coding units, or super-fragments comprises segmenting the video frame into the plurality of super-fragments, and wherein the at least one super-fragment comprises an individual region layer of the two or more region layers.

21. The machine readable medium of claim 19, wherein determining the chosen partitioning technique comprises determining the chosen partitioning technique based at least in part on a picture type of the video frame, wherein the picture type comprises the I-picture, and wherein the chosen prediction partitioning technique comprises the k-d tree partitioning technique.

22. The machine readable medium of claim 19, wherein determining the chosen partitioning technique comprises determining the chosen partitioning technique based at least in part on a picture type of the video frame, wherein the picture type comprises the P-picture and wherein the chosen prediction partitioning technique comprises the bi-tree partitioning technique.

* * * * *